US008916833B2

(12) United States Patent
Sugiyama et al.

(10) Patent No.: US 8,916,833 B2
(45) Date of Patent: Dec. 23, 2014

(54) IMAGING DEVICE AND IMAGING DISPLAY SYSTEM

(71) Applicant: Japan Display Inc., Tokyo (JP)

(72) Inventors: Hiroki Sugiyama, Tokyo (JP); Takayuki Kato, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 14/096,354

(22) Filed: Dec. 4, 2013

(65) Prior Publication Data
US 2014/0158899 A1 Jun. 12, 2014

(30) Foreign Application Priority Data

Dec. 7, 2012 (JP) ................................. 2012-268769

(51) Int. Cl.
*G01J 1/42* (2006.01)
*G01T 1/208* (2006.01)

(52) U.S. Cl.
CPC .................................... *G01T 1/208* (2013.01)
USPC ....................................................... 250/394

(58) Field of Classification Search
CPC ............ H01L 27/1214; H01L 27/3248; H01L 51/5234; G02F 2201/123; G02F 1/134336; G02F 1/1345; G02B 5/201
USPC ................. 250/394, 370.01–370.15; 378/98.8
See application file for complete search history.

(56) References Cited

U.S. PATENT DOCUMENTS

| 5,424,856 | A  | * | 6/1995  | Ito ................................. 358/483 |
| 7,541,595 | B2 | * | 6/2009  | Yagi et al. ................ 250/370.11 |
| 7,884,370 | B2 | * | 2/2011  | Huh et al. ......................... 257/72 |
| 8,619,208 | B2 | * | 12/2013 | Gosain et al. .................... 349/48 |
| 2004/0247079 | A1 | * | 12/2004 | Endo .......................... 378/98.12 |
| 2005/0202609 | A1 | * | 9/2005  | Zhang et al. ................... 438/164 |
| 2005/0274991 | A1 | * | 12/2005 | Ishii et al. ...................... 257/232 |
| 2013/0044245 | A1 | * | 2/2013  | Mabuchi et al. .............. 348/294 |

FOREIGN PATENT DOCUMENTS

JP            2011-096794         5/2011

* cited by examiner

*Primary Examiner* — Kiho Kim
(74) *Attorney, Agent, or Firm* — K&L Gates LLP

(57) ABSTRACT

According to an aspect, an imaging device includes: a plurality of pixels each including a photoelectric conversion element and arranged on a same plane; a transparent electrode provided on a surface of the photoelectric conversion element; a plurality of first conductors, each of which is electrically coupled to the transparent electrode corresponding to one photoelectric conversion element at a plurality of points and provided to the transparent electrode corresponding to one photoelectric conversion element; and a second conductor that is provided between adjacent pixels and electrically couples the first conductors, and also electrically couples the first conductors between the adjacent pixels.

7 Claims, 19 Drawing Sheets

FIG.19
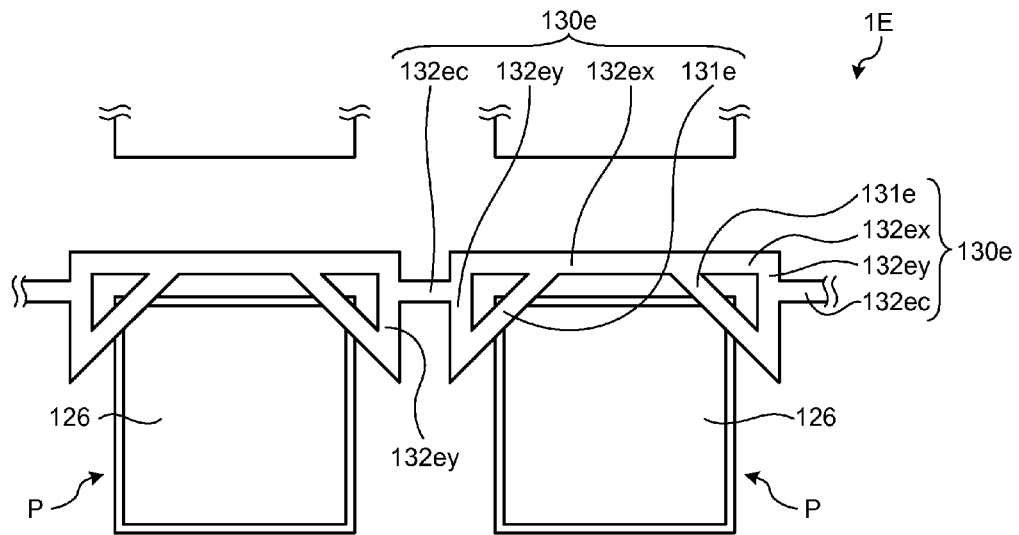
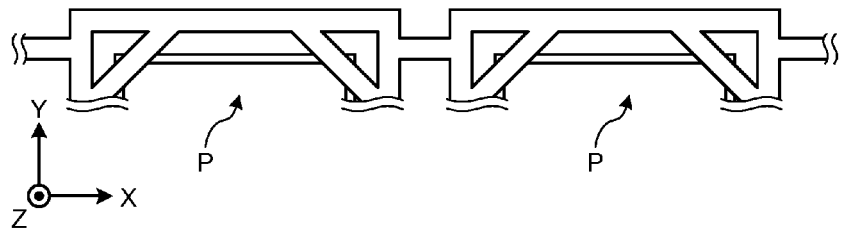
FIG.20
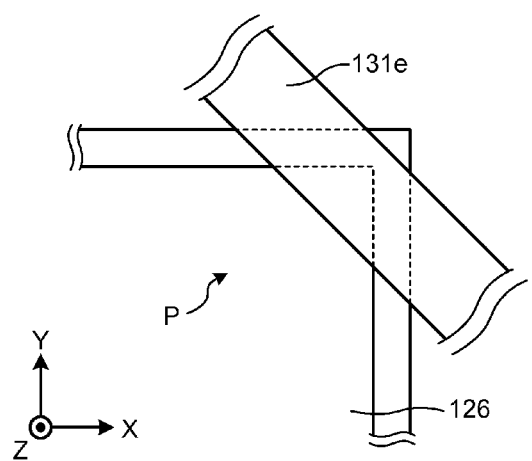

IMAGING DEVICE AND IMAGING DISPLAY SYSTEM

CROSS REFERENCES TO RELATED APPLICATIONS

The present application claims priority to Japanese Priority Patent Application JP 2012-268769 filed in the Japan Patent Office on Dec. 7, 2012, the entire content of which is hereby incorporated by reference.

BACKGROUND

1. Technical Field

The present disclosure relates to an imaging device incorporating a photoelectric conversion element and an imaging display system including such an imaging device.

2. Description of the Related Art

Various devices have been developed as imaging devices in which each pixel (imaging pixel) incorporates a photoelectric conversion element (for example, a photodiode). An imaging device incorporating the photoelectric conversion element applies a predetermined reference potential to the photoelectric conversion element as a bias potential upon imaging. For this purpose, wiring is coupled to an electrode of the photoelectric conversion element to apply the predetermined reference potential thereto. Disconnection of this wiring may cause defects in an image imaged by the imaging device. Accordingly, a technique has been developed to prevent disconnection of the wiring for applying the predetermined reference potential to the electrode of the photoelectric conversion element (for example, refer to Japanese Patent Application Laid-open Publication No. 2011-96794 (JP-A-2011-96794)).

In the technique disclosed in JP-A-2011-96794, the wiring for applying the predetermined reference potential to the electrode of the photoelectric conversion element traverses a light receiving surface of the photoelectric conversion element. Therefore, in the technique of JP-A-2011-96794, a light receiving area of the photoelectric conversion element may decrease and light detection sensitivity may deteriorate.

For the foregoing reasons, there is a need for an imaging device and an imaging display system that can prevent deterioration of the light detection sensitivity and deterioration of the reliability of the imaging device.

SUMMARY

According to an aspect, an imaging device includes: a plurality of pixels each including a photoelectric conversion element and arranged on a same plane; a transparent electrode provided on a surface of the photoelectric conversion element; a plurality of first conductors, each of which is electrically coupled to the transparent electrode corresponding to one photoelectric conversion element at a plurality of points and provided to the transparent electrode corresponding to one photoelectric conversion element; and a second conductor that is provided between adjacent pixels and electrically couples the first conductors, and also electrically couples the first conductors between the adjacent pixels.

According to another aspect, an imaging display system includes: the imaging device; a wavelength conversion member provided on a light incident surface side of the imaging device; and a display device that displays an image based on an imaging signal output from the imaging device.

Additional features and advantages are described herein, and will be apparent from the following Detailed Description and the figures.

BRIEF DESCRIPTION OF THE FIGURES

FIG. 19 is a diagram illustrating an imaging device according to a fourth modification;

FIG. 20 is an enlarged view of a connecting portion between the first conductor and the transparent electrode of the pixel;

DETAILED DESCRIPTION

An embodiment of the present disclosure will be described in detail in the following order with reference to the accompanying drawings.

Figure 1:
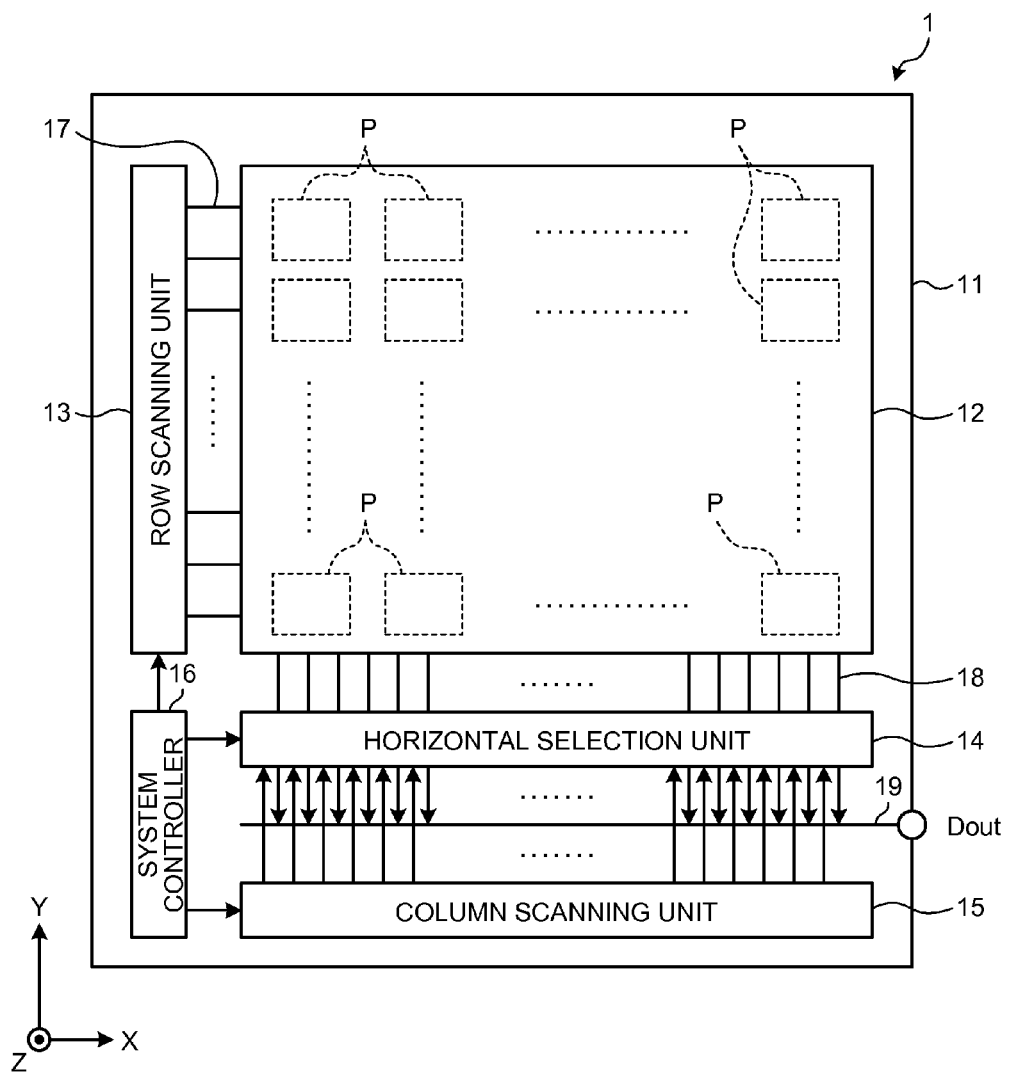
FIG. 1 is a functional block diagram illustrating an imaging device according to an embodiment.
Figure 2:
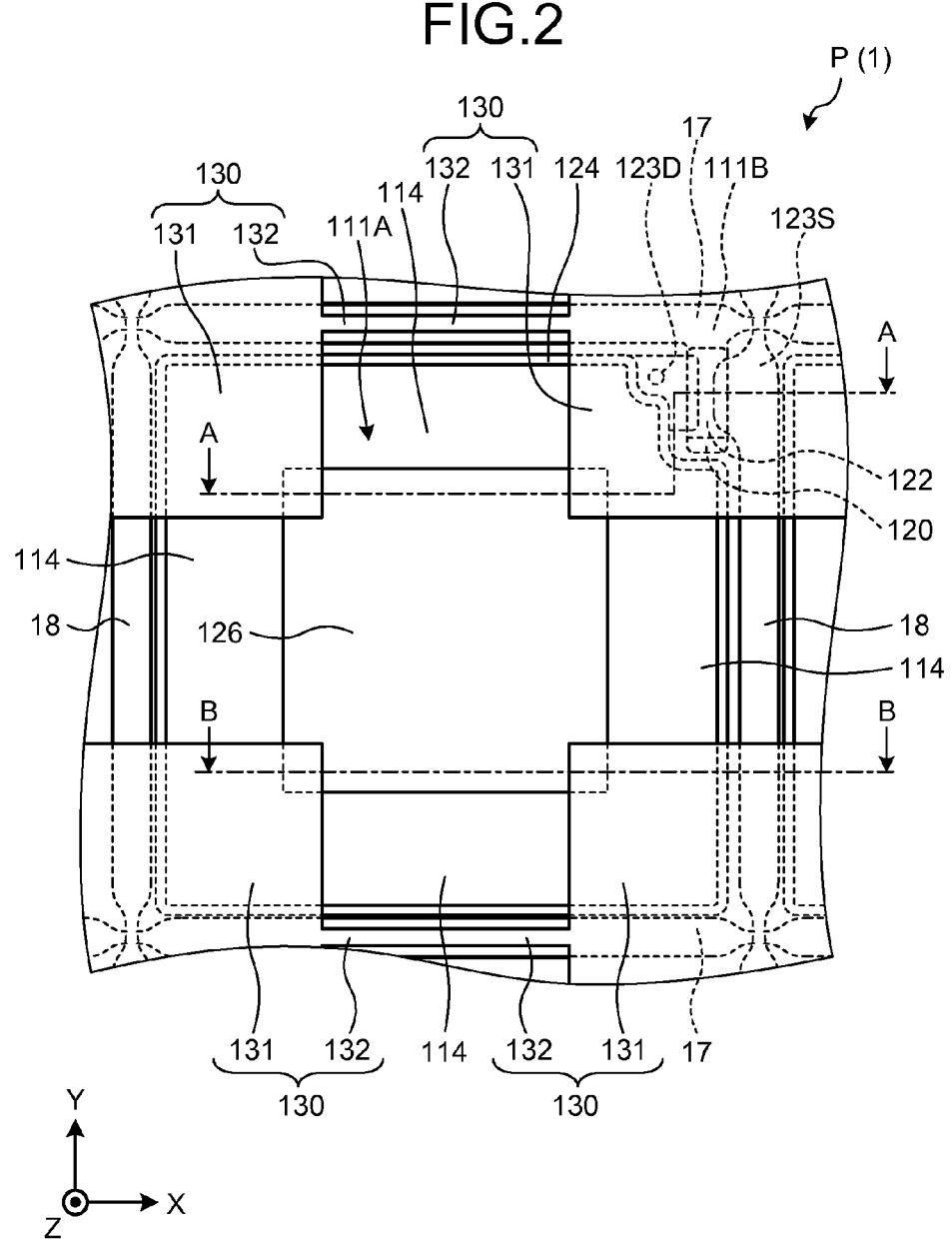
FIG. 2 is a plan view of a pixel included in the imaging device.

1. Imaging Device
   1-1. Entire structure
   1-2. Cross-sectional structure of pixel
   1-3. Wiring
   1-4. Operation of imaging device
   1-5. Method for manufacturing imaging device 2. Modifications
  2-1. First modification
  2-2. Second modification
  2-3. Third modification
  2-4. Fourth modification
  2-5. Fifth modification
3. Application Example
4. Aspects of the Present Disclosure 1. Imaging Device 1-1. Entire Structure FIG. 1 is a functional block diagram illustrating an imaging device according to an embodiment. FIG. 2 is a plan view of a pixel included in the imaging device. This imaging device 1 is a device that images a subject by receiving radiation light of which wavelength is converted, such as α-rays, β-rays, γ-rays, and X-rays, and reading image information based on the radiation. The imaging device 1 is suitably used as an X-ray imaging device for medical use or for non-destructive inspection such as baggage inspection.

The imaging device 1 includes, on a surface of a substrate 11, a pixel area 12 as an imaging region (imaging area) and a peripheral circuit including a row scanning unit 13, a horizontal selection unit 14, a column scanning unit 15, and a system controller 16. The peripheral circuit has a function as a drive circuit that drives the pixel area 12. The row scanning unit 13, the horizontal selection unit 14, the column scanning unit 15, and the system controller 16 included in the peripheral circuit are arranged in the peripheral region of the pixel area 12.

1-1A. Pixel Area 12

For example, the pixel area 12 includes unit pixels P (hereinafter, also referred to as pixels P as appropriate) that are two-dimensionally arranged in a matrix. In the embodiment, the row direction of the pixels P arranged in a matrix is defined as the X direction, and the column direction thereof is defined as the Y direction. The X direction and the Y direction correspond to one coordinate axis and the other coordinate axis orthogonal thereto in a two-dimensional orthogonal coordinate system, respectively. That is, in the embodiment, the pixels P are arranged on the same plane (same flat plane) that is the X-Y plane. The direction orthogonal to the X direction and the Y direction is the Z direction.

The pixel area 12 includes a plurality of pixel drive lines 17 as drive lines and a plurality of vertical signal lines 18 as signal lines. The pixel drive lines 17 extend in the row direction, which is the X direction, and are arranged in the column direction, which is the Y direction. The vertical signal lines 18 extend in the column direction, which is the Y direction, and are arranged in the row direction, which is the X direction. The pixel drive lines 17 and the vertical signal lines 18 cross each other, and in the embodiment, they are orthogonal to each other.

For example, the pixel drive line 17 is wiring for transmitting a signal to be used to select the row of pixels P, control a reset, and read out a signal from the pixels P. The pixel drive line 17 is electrically coupled to a gate electrode 120 of a semiconductor layer 122 of a thin film transistor (hereinafter thin film transistor is described as TFT) 111B (refer to FIG. 2) as a driving element included in each of the pixels P. Accordingly, the pixel drive line 17 is also referred to as a gate line. The vertical signal line 18 is wiring for transmitting a signal output from each of the pixels P. As illustrated in FIG. 2, the vertical signal line 18 is electrically coupled to a source electrode 123S of the semiconductor layer 122 of the TFT 111B included in each of the pixels P. Accordingly, the pixel drive line 17 is also referred to as a source line. As illustrated in FIG. 2, in the pixel P, a drain electrode 123D of the semiconductor layer 122 of TFT 111B is electrically coupled to a lower electrode 124 of a photodiode 111A.

As illustrated in FIG. 2, the pixel P included in the pixel area 12 includes a photodiode 111A as a photoelectric conversion element and the TFT 111B as a driving element. The pixels P are arranged on the same plane, so that the photodiode 111A and the TFT 111B included in each of the pixels P are also arranged on the same plane. In the embodiment, the photodiode 111A and the TFT 111B are formed on a surface of the substrate 11. Accordingly, a plurality of photodiodes 111A, a plurality of TFTs 111B, and the pixels P including the photodiodes 111A and the TFTs 111B are arranged on the same plane that is the surface of the substrate 11.

As illustrated in FIG. 2, the pixel P is arranged in a rectangular (in the embodiment, a square) region surrounded by two pixel drive lines 17 arranged in parallel and two vertical signal lines 18 arranged in parallel and orthogonal to the pixel drive lines 17. In the pixel P, corner parts of the rectangular region are occupied by contact holes, the TFTs 111B, and the like, so that the corner parts are formed in a stepped form as illustrated in FIG. 2. Accordingly, in actuality, the pixel P has a shape close to a rectangle (in the embodiment, a shape close to a square) in a plan view. When a stepped form in which parts of the corner parts are chipped off results from occupation of the corner parts of the rectangular region by the contact holes or the TFTs 111B, such a shape is referred to as a substantially rectangular shape (in the embodiment, a substantially square shape) or a polygonal shape (in the embodiment, a square shape). The pixel P includes the photodiode 111A and the TFT 111B. In the photodiode 111A, the central part of a protective layer 114 as a protective layer is removed in a rectangular shape (in the embodiment, a square shape) to leave an upper electrode 126 as a transparent electrode exposed. As described later, in the pixel P, a second planarization layer is arranged on a surface of the upper electrode 126 and the protective layer 114. However, the second planarization layer is not illustrated in the example in FIG. 2 for convenience of explanation.

In the pixel P, a predetermined reference potential (bias potential) is applied to an end of the photodiode 111A (for example, the upper electrode 126). The upper electrode 126 of the photodiode 111A as the photoelectric conversion element included in the pixel P is electrically coupled to a first conductor 131 for applying the reference potential. The first conductors 131 are arranged to be positioned at the four corners of the rectangular pixel P (four corners of the rectangular region), respectively, and the upper electrode 126 of each pixel P is electrically coupled to the first conductors 131 at the four portions. The first conductors 131 adjacent to each other in the row direction are electrically coupled by a second conductor 132. The second conductor 132 is arranged in a gap between the pixels P adjacent to each other. In the embodiment, the first conductor 131 and the second conductor 132 are integrally formed. The integrally formed first conductors 131 and the second conductors 132 are referred to as wiring 130 as appropriate.

The first conductor 131 is formed on surfaces of the protective layers 114 and the upper electrodes 126 of the adjacent pixels P. The first conductor 131 is electrically coupled to the upper electrodes 126 of the adjacent pixels P. As described above, in the embodiment, one first conductor 131 is electrically coupled to the upper electrodes 126 of four pixels P. In one pixel P, the upper electrode 126 is electrically coupled to four first conductors 131.

In the embodiment, in the wiring 130, the first conductors 131 adjacent to each other in the row direction are electrically coupled by the second conductor 132. Accordingly, the wiring 130 extends in the row direction. The pixel drive line 17 is arranged between the adjacent pixels P and extends in the row direction. Accordingly, in the embodiment, the wiring 130 is arranged overlapping with the pixel drive line 17 in a plan view. The following describes a peripheral circuit included in the imaging device 1.

1-1B. Peripheral Circuit

The row scanning unit 13 illustrated in FIG. 1 includes a shift register, an address decoder, and the like. The row scanning unit 13 is a pixel driving unit that drives pixels P in the pixel area 12 row by row, for example. A signal (imaging signal) output from each pixel P in a pixel row selected in scanning by the row scanning unit 13 is input to the horizontal selection unit 14 through the vertical signal line 18 corresponding to the pixel P. The horizontal selection unit 14 includes an amplifier, a horizontal selection switch, and the like provided for each vertical signal line 18.

The column scanning unit 15 includes a shift register, an address decoder, and the like. The column scanning unit 15 scans to sequentially drive each horizontal selection switch of the horizontal selection unit 14. Through the selective scanning by the column scanning unit 15, the signal of each pixel P transmitted through the vertical signal line 18 is output sequentially to a horizontal signal line 19. The signal of each pixel P is transmitted to the outside of the substrate 11 through the horizontal signal line 19.

A circuit section including the row scanning unit 13, the horizontal selection unit 14, the column scanning unit 15, and the horizontal signal line 19 may be directly formed on the surface of the substrate 11. The circuit section described above may be arranged in an external control integrated circuit (IC). The circuit section described above may be formed on another substrate coupled by a cable and the like.

A clock given from the outside of the substrate 11, data that instructs an operation mode, and the like are input to the system controller 16. The system controller 16 outputs data such as internal information of the imaging device 1. The system controller 16 further includes a timing generator that generates various timing signals. The system controller 16 drives and controls the peripheral circuit including the row scanning unit 13, the horizontal selection unit 14, and the column scanning unit 15 based on the various timing signals generated in the timing generator described above. The following describes a cross-sectional structure of the pixel P.

1-2. Cross-Sectional Structure of a Pixel

Figure 3:
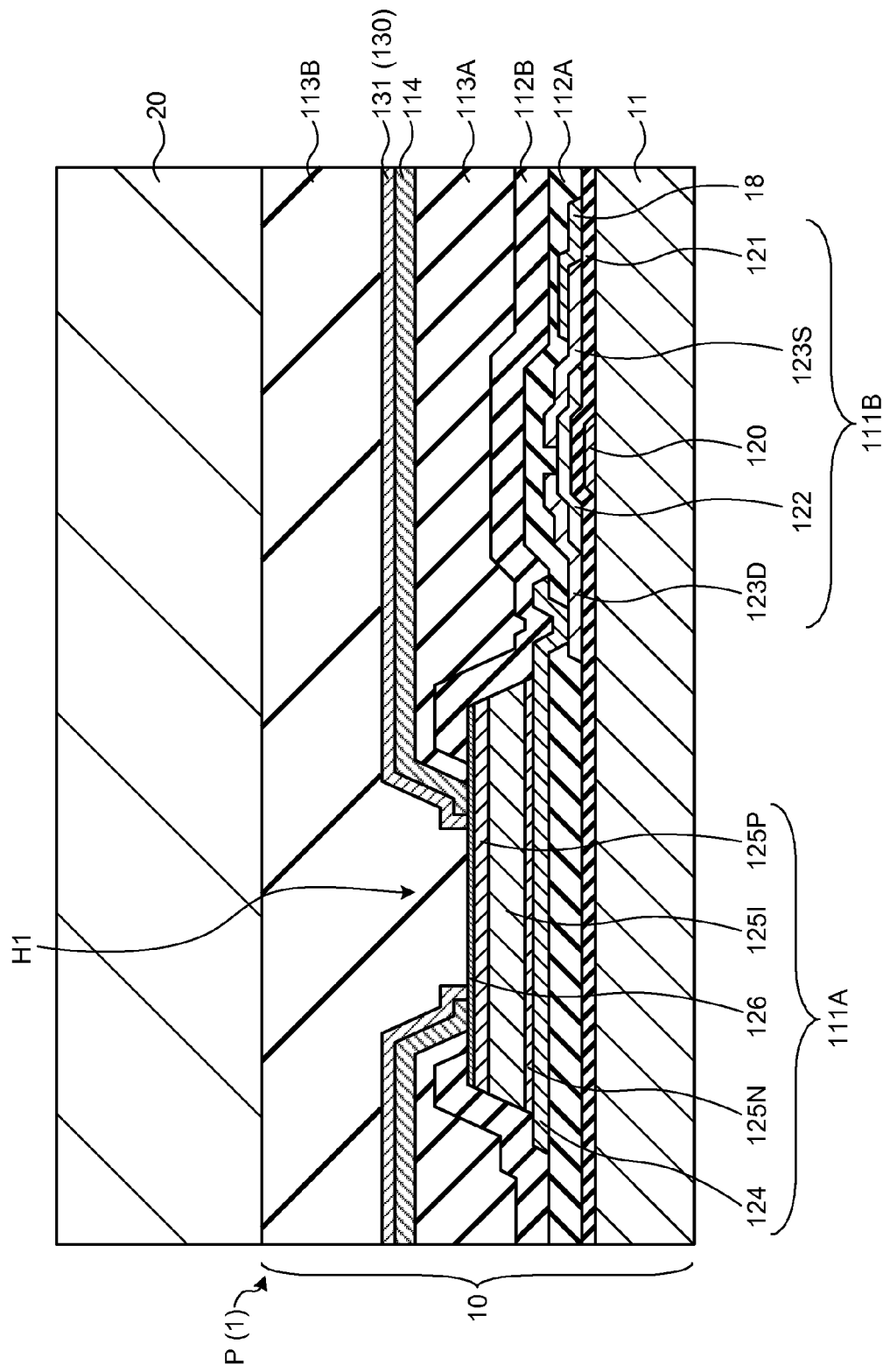
FIG. 3 is a cross-sectional view along line A-A of FIG. 2.
Figure 4:
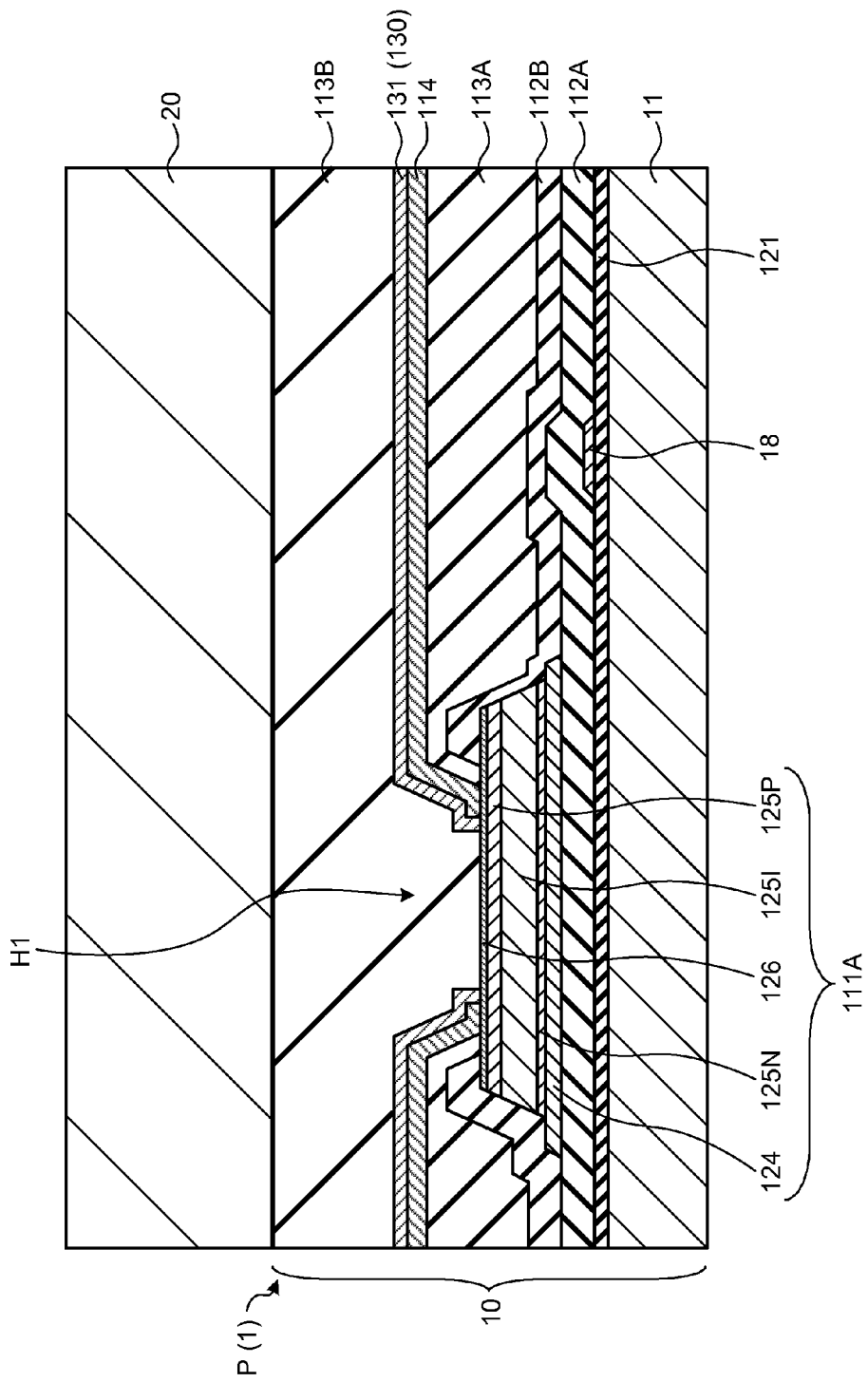
FIG. 4 is a cross-sectional view along line B-B of FIG. 2.

FIG. 3 is a cross-sectional view along line A-A of FIG. 2. FIG. 4 is a cross-sectional view along line B-B of FIG. 2. The cross-sectional structure illustrated in FIG. 4 is similar to the cross-sectional structure illustrated in FIG. 3. However, in the cross-sectional structure of FIG. 4, the vertical signal line 18 instead of the TFT 111B is formed on the substrate 11. Specifically, in a selective region between a gate insulating layer 121 and a first insulating interlayer 112A, the formation region of the TFT 111B is illustrated in FIG. 3, and alternatively, the vertical signal line 18 is illustrated in FIG. 4.

In the imaging device 1, formed on the substrate 11 is a pixel circuit that includes a plurality of photodiodes 111A (photoelectric conversion elements) and the TFTs 111B as the driving elements of the photodiodes 111A. They are referred to as a sensor substrate 10 as appropriate. The pixel P includes one photodiode 111A and one TFT 111B.

In FIGS. 3 and 4, a wavelength conversion member 20 is arranged on the surface side of the sensor substrate 10. The sensor substrate 10 and the wavelength conversion member 20 are manufactured as separate modules, for example. The wavelength conversion member 20 will be described later.

In the embodiment, the photodiode 111A and the TFT 111B are formed on the substrate 11 made of glass or the like, for example. Part of the photodiode 111A and part of the TFT 111B (in the embodiment, the gate insulating layer 121, the first insulating interlayer 112A, and a second insulating interlayer 112B to be described later) share the same layer.

The gate insulating layer 121 is provided on the substrate 11. For example, the gate insulating layer 121 is a single layer made of one of a silicon oxide ($SiO_2$) layer, a silicon oxynitride (SiON) layer, and a silicon nitride (SiN) layer, or a laminated layer made of two or more thereof.

The first insulating interlayer 112A is provided on a surface of the gate insulating layer 121. For example, the first insulating interlayer 112A is an insulating layer such as a silicon oxide layer or a silicon nitride layer. The first insulating interlayer 112A also functions as a protective layer (passivation layer) that covers the TFT 111B to be described later.

1-2A. Photodiode 111A

The photodiode 111A is a photoelectric conversion element that generates an electric charge (optical charge) of amount corresponding to the amount of incident light (the amount of received light) and accumulates therein the electric charge. For example, the photodiode 111A is a positive intrinsic negative diode (PIN) type photodiode. For example, the sensitivity range of the photodiode 111A is a visible light range (a reception wavelength band is the visible light range). For example, the photodiode 111A is arranged in a selective region on the surface side of the substrate 11 via the gate insulating layer 121 and the first insulating interlayer 112A.

Specifically, the photodiode 111A includes the lower electrode 124, an n-type semiconductor layer 125N, an i-type semiconductor layer 125I, a p-type semiconductor layer 125P, and the upper electrode 126 that are laminated in this order on the surface of the first insulating interlayer 112A. Among these, the n-type semiconductor layer 125N, the i-type semiconductor layer 125I, and the p-type semiconductor layer 125P correspond to a specific example of a photoelectric conversion layer in the present disclosure. In an example according to the embodiment, the n-type semiconductor layer 125N is arranged on the substrate 11 side (the lower side), and the p-type semiconductor layer 125P is arranged on a side further away from the substrate 11 (the upper side). However, the embodiment is not limited thereto. For example, a structure opposite to the above structure may be adopted, such that the p-type semiconductor layer is arranged on the lower side (the substrate side) and the n-type semiconductor layer is arranged on the upper side.

The lower electrode 124 is an electrode for reading out a signal charge from the photoelectric conversion layer (the n-type semiconductor layer 125N, the i-type semiconductor layer 125I, and the p-type semiconductor layer 125P). In the embodiment, the lower electrode 124 is electrically coupled to the drain electrode 123D (to be described later) in the TFT 111B. For example, the lower electrode 124 has a three-layered structure (Mo/Al/Mo) in which molybdenum (Mo), aluminum (Al), and molybdenum are laminated.

For example, the n-type semiconductor layer 125N is made of amorphous silicon (a-Si) and forms an n+ region. The thickness of the n-type semiconductor layer 125N is about 10 nm to 50 nm, for example.

The i-type semiconductor layer 125I is a semiconductor layer having lower conductivity than that of the n-type semiconductor layer 125N and the p-type semiconductor layer 125P, such as a non-doped intrinsic semiconductor layer. The i-type semiconductor layer 125I is made of amorphous silicon (a-Si), for example. The thickness of the i-type semiconductor layer 125I is about 400 nm to 1000 nm, for example. As the thickness increases, light sensitivity increases.

For example, the p-type semiconductor layer 125P is made of amorphous silicon (a-Si), and forms a p+ region. For example, the thickness of the p-type semiconductor layer 125P is about 40 nm to 50 nm.

The upper electrode 126 is an electrode for supplying, for example, the reference potential (bias potential) at the time of photoelectric conversion to the photoelectric conversion layer described above. As described above, the upper electrode 126 is electrically coupled to the wiring 130 as power supply wiring for supplying the reference potential, more specifically, to the first conductor 131 of the wiring 130. For example, the upper electrode 126 is a transparent conductive layer made of indium tin oxide (ITO), or the like.

1-2B. TFT 111B

The TFT 111B is an element for extracting the electric charge accumulated in the photodiode 111A. For example, in the embodiment, the TFT 111B is a field effect transistor (FET). The TFT 111B has the gate electrode 120 including, for example, titanium (Ti), Al, Mo, tungsten (W), chromium (Cr), and the like and formed on the surface of the substrate 11. The gate insulating layer 121 described above is formed on the surface of the gate electrode 120.

The semiconductor layer 122 is formed on the surface of the gate insulating layer 121. The semiconductor layer 122 has a channel region. The semiconductor layer 122 is formed of polycrystalline silicon, microcrystalline silicon, or amorphous silicon, for example. The semiconductor layer 122 may be formed of an oxide semiconductor such as indium gallium zinc oxide (InGaZnO), zinc oxide (ZnO), or the like.

On the surface of the semiconductor layer 122, formed are the source electrode 123S and the drain electrode 123D coupled to a signal line for readout and various pieces of wiring. Specifically, the drain electrode 123D is electrically coupled to the lower electrode 124 of the photodiode 111A, and the source electrode 123S is electrically coupled to the vertical signal line 18 (source line) to be described later. Each of the source electrode 123S and the drain electrode 123D is made of Ti, Al, Mo, W, or Cr, for example.

The sensor substrate 10 includes the second insulating interlayer 112B, a first planarization layer 113A, the protective layer 114, the wiring 130, and a second planarization layer 113B that are provided in this order on an upper layer of the photodiode 111A and the TFT 111B (a layer further away from the surface of the substrate 11).

1-2C. Second Insulating Interlayer 112B

The second insulating interlayer 112B is provided to cover the TFT 111B and the side surface and an end of the top surface (the surface of the upper electrode 126) of the photodiode 111A. For example, the second insulating interlayer 112B is formed of an insulating layer such as a silicon oxide layer or a silicon nitride layer. The second insulating interlayer 112B corresponds to a specific example of the insulating interlayer according to the present disclosure.

1-2D. First Planarization Layer 113A

The first planarization layer 113A is arranged on the upper layer side of the photodiode 111A and the TFT 111B, that is, at a position further away from the substrate 11. In the embodiment, the first planarization layer 113A is formed of a black layer. Specifically, the black layer is formed of blackened resin (resin blackened by including light shielding particles listed below), for example. Specifically, for example, the blackened resin is formed such that particles of at least one of carbon (C), titanium (Ti), and the like (light shielding particles) are dispersed in transparent resin such as acrylic as the light shielding particles described above. Because of such a structure, the first planarization layer 113A exhibits conductivity in some cases. Accordingly, it is preferable that resistance of the first planarization layer 113A is as high as possible, that is, the conductivity thereof is as low as possible.

The thickness of the first planarization layer 113A is preferably about 2.1 µm or less, for example, at a portion (flattened part) except the formation region of the photodiode 111A. This is to achieve both an effect for reducing incidence of stray light to be described later (incident light from the adjacent pixel) and a planarization effect (effect for preventing disconnection). The first planarization layer 113A has an opening H1 formed corresponding to the vicinity of the formation region of the photodiode 111A. In the embodiment, the side surface of the opening H1 is formed in a taper shape. The side surface of the opening H1 is arranged on the surface of the upper electrode 126 of the photodiode 111A. The first planarization layer 113A corresponds to a specific example of the planarization layer according to the present disclosure.

When the black layer as described above is used as the first planarization layer 113A, no incident light from the outside on the photodiode 111A penetrates through the first planarization layer 113A. That is, the incident light is prevented from entering the TFT 111B, which means that the TFT 111B is prevented from being irradiated with light, thereby reducing light leakage in the TFT 111B. This reduces deterioration of characteristics (readout characteristics) caused by the incident light in the TFT 111B.

Stray light from an adjacent pixel P and the like is also prevented from entering the photodiode 111A via the first planarization layer 113A. This reduces noise components in imaging signals obtained from the photodiode 111A, more specifically, noise components caused by the stray light.

As described above, the first planarization layer 113A can reduce the deterioration in the characteristics of the TFT 111B caused by the light leakage and can reduce the noise components in the imaging signals caused by the incidence of the stray light. As a result, the first planarization layer 113A can improve image quality of an imaged image. Moreover, in the imaging device 1, it is not necessary to separately provide a member (such as a light shielding layer) for preventing incidence of the incident light and the stray light described above or the like, so that production cost is reduced and the image quality is improved.

The protective layer 114 is provided to part of the upper electrode 126 and the entire surface of the first planarization layer 113A. For example, the protective layer 114 is an insulating layer such as a silicon oxide layer or a silicon nitride layer. In the embodiment, the wiring 130 is provided to part of the surface of the protective layer 114. The wiring 130 is electrically coupled to part of the surface of the upper electrode 126. The second planarization layer 113B is provided to the entire surface of the protective layer 114 and the wiring 130. The second planarization layer 113B is made of transparent resin material such as polyimide.

Although the black layer is used as the first planarization layer 113A in the embodiment, the first planarization layer 113A is not limited to the black layer. For example, the first planarization layer 113A may be made of transparent resin. When the first planarization layer 113A is made of transparent resin, the protective layer 114 may not be provided.

1-2E. Wavelength Conversion Member 20

In the embodiment, as described above, the wavelength conversion member 20 is a module different from the sensor substrate 10. For example, the wavelength conversion member 20 includes a scintillator plate (scintillator panel) and the like. That is, the wavelength conversion member 20 is a planar (plate-like) member, such that a scintillator layer (a wavelength conversion layer) is provided on a transparent substrate made of glass or the like, for example. A protective layer having moisture-proof property may further be formed on the surface of the scintillator layer. The protective layer described above may be provided to cover the entirety of the scintillator layer and the sensor substrate 10.

For example, as the wavelength conversion member 20, used is a scintillator (fluorescent substance) that converts radiations (X-rays) into visible light. That is, the wavelength conversion member 20 has a function for converting the wavelengths of radiations (X-rays) entered from the outside into wavelengths in the sensitivity range (visible light range) of the photodiode 111A as the photoelectric conversion element. For example, examples of such a fluorescent substance include cesium iodide (CsI) with thallium (Tl) added (CsI; Tl), cadmium sulfur oxide ($Gd_2O_2S$) with terbium (Tb) added, and BaFx (x is Cl, Br, I, or the like).

The thickness of the scintillator layer is preferably from 100 μm to 600 μm. For example, when CsI; Tl is used as fluorescent substance material, the thickness is about 600 μm. The scintillator layer can be formed on the surface of the transparent substrate using a vacuum evaporation method, for example. In the embodiment, the scintillator plate as described above exemplifies the wavelength conversion member 20. However, it is sufficient that the wavelength conversion member 20 is a wavelength conversion member that can convert the wavelengths of the radiations into the wavelengths in the sensitivity range of the photodiode 111A. Therefore, the fluorescent substance used for the wavelength conversion member 20 is not limited to the material described above. Next, the wiring 130 will be described in more detail.

1-3. Wiring

Figure 5:
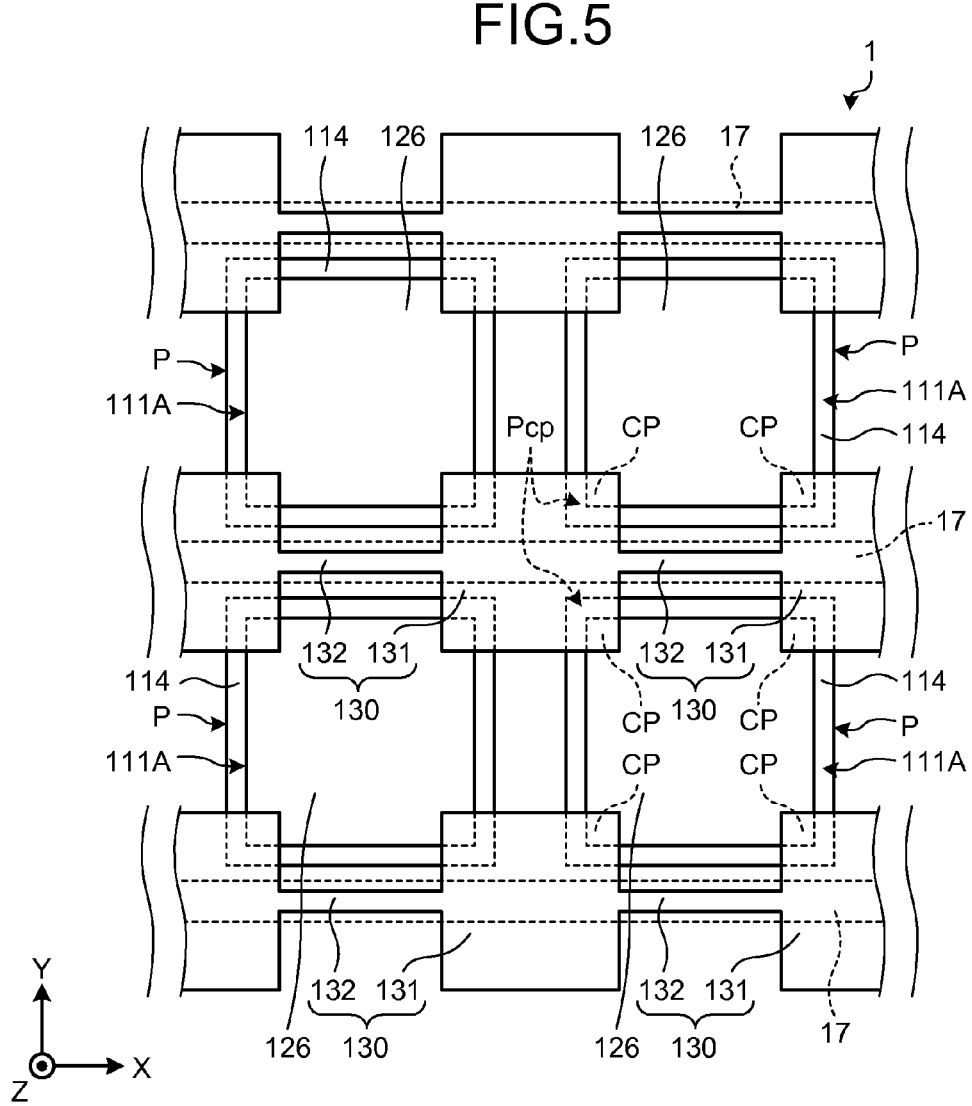
FIG. 5 is a plan view of wiring included in the imaging device according to the embodiment.

FIG. 5 is a plan view of the wiring included in the imaging device according to the embodiment. As described above, the first conductors 131 of the wiring 130 are electrically coupled to a plurality of points on the upper electrode 126 corresponding to the photodiode 111A as one photoelectric conversion element included in one pixel P. The first conductors 131 are provided to the upper electrode 126 corresponding to the photodiode 111A included in each pixel P. In the embodiment, although the first conductor 131 has a rectangular shape (including a square shape) in a plan view, the shape of the first conductor 131 in a plan view is not limited thereto. In the example illustrated in FIG. 5, the photodiode 111A of each pixel P is coupled to four first conductors 131. A point at which the first conductor 131 is coupled to the upper electrode 126 is referred to as a coupling point CP as appropriate. In the example illustrated in FIG. 5, the upper electrode 126 includes four coupling points CP.

As described above, the second conductor 132 is provided between adjacent pixels P and electrically couples the first conductors 131 each of which is electrically coupled to the upper electrode 126 of the photodiode 111A included in one pixel P. In this example, the second conductor 132 electrically couples the first conductors 131 that are adjacent to each other in the row direction, which is the X direction. Moreover, the second conductor 132 electrically couples the first conductors 131 between the adjacent pixels P, more specifically, between the pixels P that are adjacent to each other in the row direction.

Figure 6:
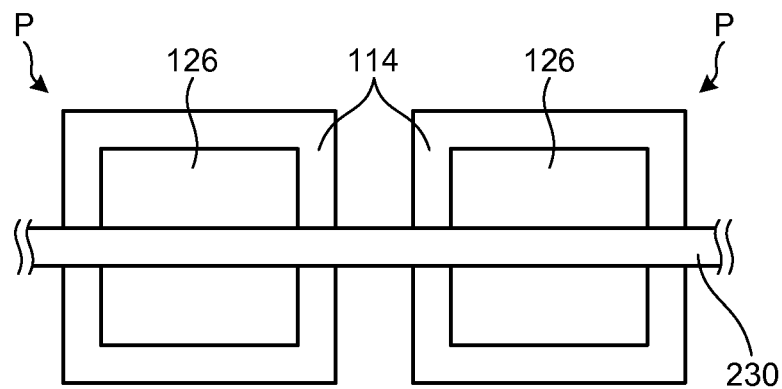
FIG. 6 is a plan view illustrating a pixel and wiring according to a comparative example.

FIG. 6 is a plan view illustrating a pixel and wiring according to a comparative example. As in the comparative example of FIG. 6, wiring 230 may traverse the photodiode of one pixel P to electrically couple the upper electrodes 126 included in the photodiodes of a plurality of pixels in some cases. In such a coupling structure of the wiring 230 and the upper electrode 126, disconnection in the wiring 230 may occur at a stepped portion between the protective layer 114 and the upper electrode 126. When the wiring 230 is disconnected, the predetermined reference potential is not applied to the upper electrode 126 included in the pixel P at a position further away from the row scanning unit 13 illustrated in FIG. 1 than the disconnected portion. As a result, the image imaged by the imaging device 1 illustrated in FIG. 1 may have a defect. Moreover, the wiring 230 traversing the surface of the photodiode may reduce the light receiving area of the photodiode.

In the imaging device 1 illustrated in FIG. 5, a level difference exists between the upper electrode 126 and the protective layer 114 of the photodiode 111A, so that possibility of the disconnection in the first conductor 131 cannot be completely eliminated. However, in the imaging device 1, the first conductors 131 are electrically coupled to a plurality of portions of the upper electrode 126 corresponding to one photodiode 111A. Among the first conductors 131 coupled to the upper electrode 126 of one photodiode 111A, the adjacent first conductors 131 are electrically coupled by the second conductor 132 arranged between the adjacent pixels P.

As described above, in the wiring 130, the first conductors 131 are electrically coupled to the upper electrode 126 of one photodiode 111A at a plurality of portions, so that even if one first conductor 131 is disconnected at one portion, the function of the wiring 130 may be maintained by another first conductor 131 that is not disconnected. As a result, when the first conductor 131 is disconnected, the wiring 130 can apply the predetermined reference potential to the upper electrode 126 of the pixel P at a position further away from the row scanning unit 13 than the disconnected portion. Moreover, the wiring 130 also has the second conductor 132 as a conductive path different from the first conductor 131 electrically coupled to the upper electrode 126. Accordingly, even if the first conductor 131 is disconnected between the protective layer 114 and the upper electrode 126, the second conductor 132 maintains conduction in a direction along which the wiring 130 extends (in the embodiment, the row direction). As a result, the wiring 130 can supply power to the upper electrode 126 of the pixel P at a position further away from the row scanning unit 13 than the portion at which the first conductor 131 is disconnected. Because of such effects, the wiring 130 can prevent reduction in the reliability of the imaging device 1.

No level difference between the protective layer 114 and the upper electrode 126 exists between the adjacent pixels P where the second conductor 132 that electrically couples the first conductors 131 is arranged. Accordingly, the second conductor 132 can reduce the possibility of disconnection caused by the level difference in the pixel P. As a result, the wiring 130 can further prevent reduction in the reliability of the imaging device 1.

The first conductors 131 are electrically coupled to the upper electrode 126 of the photodiode 111A at the four corners of the pixel P having a rectangular shape in a plan view. Accordingly, the wiring 130 does not traverse the surface of the photodiode 111A, thus preventing reduction in the light receiving area of the photodiode 111A and in the value of a signal output from the photodiode 111A. This prevents deterioration in detection sensitivity of light or radiation in the imaging device 1.

In the embodiment, the second conductor 132 is provided at a position overlapping with the pixel drive line 17 for giving a signal for driving the TFT 111B (driving signal) to the TFT 111B, when viewed from the direction orthogonal to the surface of the photodiode 111A (in a plan view). Such an arrangement structure of the wiring 130 reduces a region in the second conductor 132 overlapping with the vertical signal line 18 of the TFT 111B in a plan view. This reduces capacitance between the second conductor 132 and the vertical signal line 18, and thus reduces influence of the capacitance described above on an output of the photodiode 111A. Noise from the vertical signal line 18 can also be reduced. The arrangement structure of the wiring 130 according to the embodiment thus can prevent reduction in detection accuracy of light or radiation.

As illustrated in FIG. 5, in the embodiment, the first conductors 131 are provided to the four respective corners of the pixel P and electrically couple the upper electrodes 126 at opposed corners (corners of the rectangular region) of adjacent pixels P. In the example illustrated in FIG. 5, one first conductor 131 electrically couples the upper electrodes 126 at positions Pcp of opposed corners of the pixels P adjacent to each other in the column direction (Y direction). In the example illustrated in FIG. 5, the first conductor 131 is arranged at a position surrounded by four pixels P and electrically couples the upper electrodes 126 corresponding to the four pixels P. Accordingly, in the imaging device 1, one first conductor 131 can electrically couple the upper electrodes 126 included in the photodiodes 111A of the pixels P.

Figure 7:
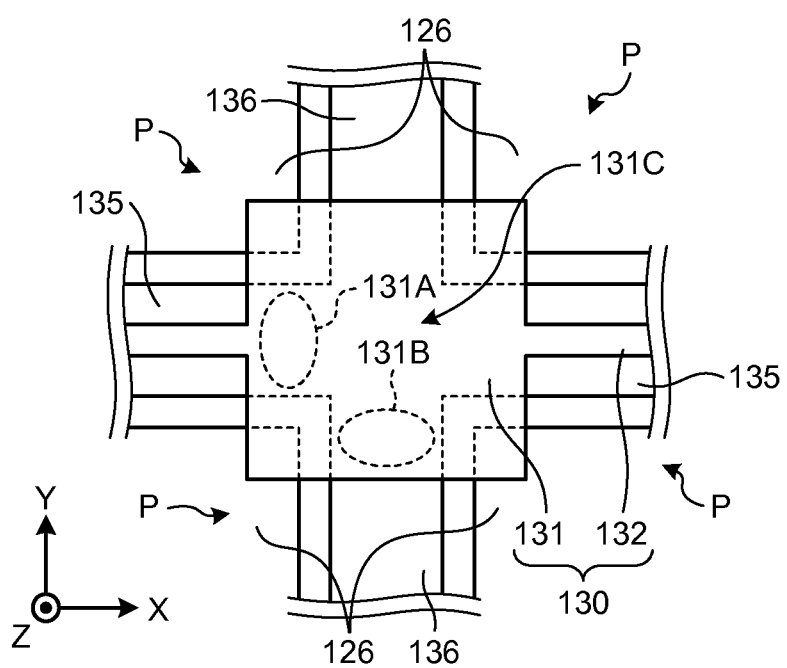
FIG. 7 is an enlarged plan view illustrating a first conductor included in the wiring.

FIG. 7 is an enlarged plan view illustrating the first conductor included in the wiring. In the embodiment, at least one, or preferably all, of the first conductors 131 electrically coupled to the upper electrode 126 corresponding to one photodiode 111A are electrically coupled through a row-direction gap 135 and a column-direction gap 136. The row-direction gap 135 is a gap in the row direction (X direction) formed between the pixels P adjacent to each other in the column direction (Y direction), and the column-direction gap 136 is a gap in the column direction (Y direction) formed between the pixels P adjacent to each other in the row direction (X direction). In the embodiment, one first conductor 131 electrically couples the upper electrodes 126 corresponding to the pixels P to cover a portion surrounded by the four pixels P, that is, a portion at which the row-direction gap 135 and the column-direction gap 136 intersect.

Accordingly, in the first conductor 131, a first portion 131A between the pixels P adjacent to each other in the column direction and a second portion 131B between the pixels P adjacent to each other in the row direction are electrically coupled through a central portion 131C of the first conductor 131 at which the row-direction gap 135 and the column-direction gap 136 intersect. Because of such a structure, even if the first conductor 131 is disconnected on the row direction side or the column direction side of the upper electrode 126, the conduction between the first conductor 131 and the upper electrode 126 can be secured on the other side where disconnection does not occur. As a result, power supply to the upper electrode 126 may be secured across the entire region of the wiring 130, thus improving the reliability of the imaging device 1.

1-3A. Modification of Arrangement of Wiring 130

Figure 8:
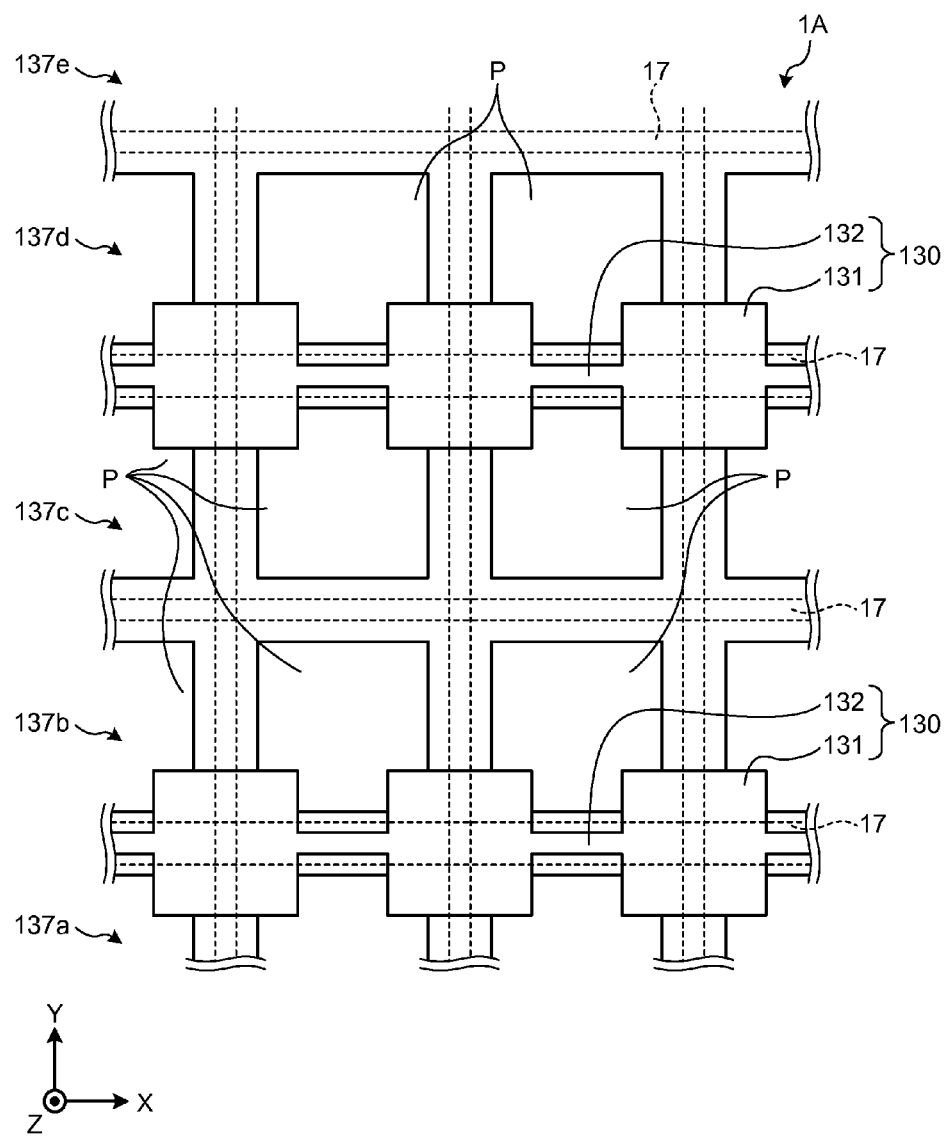
FIG. 8 is a plan view illustrating a modification of arrangement of the wiring according to the embodiment.

FIG. 8 is a plan view illustrating a modification of the arrangement of the wiring according to the embodiment. In an imaging device 1A, the wiring 130 including the first conductor 131 and the second conductor 132 is arranged between a pixel row 137a and a pixel row 137b, and between a pixel row 137c and a pixel row 137d. In the imaging device 1A, the wiring 130 is not arranged between the pixel row 137b and the pixel row 137c, and between the pixel row 137d and a pixel row 137e.

As described above, in the imaging device 1A, the wiring 130 is arranged in the column direction (Y direction) at every other row of the pixel rows 137a to 137e of the pixels P arranged in the row direction (X direction). This arrangement reduces the number of overlapping of the wiring 130 and the pixel drive line 17, thereby reducing the influence of the capacitance generated therebetween as compared to the imaging device 1 described above. The following describes operation of the imaging devices 1 and 1A.

1-4. Operation of Imaging Device

For example, when radiation applied from a radiation source not illustrated (for example, an X-ray source) enters the imaging device 1 or 1A after penetrating through a subject (a body to be detected), the incident radiation is subjected to photoelectric conversion after wavelength conversion to generate an image of the subject as an electric signal (imaging signal). Specifically, the wavelength of the radiation incident on the imaging device 1 is converted into a wavelength in the sensitivity range (herein, a visible light range) of the photodiode 111A by the wavelength conversion member 20. That is, the wavelength conversion member 20 on which the radiation is incident emits visible light. The visible light generated by the wavelength conversion member 20 then enters the sensor substrate 10.

In the sensor substrate 10, when the predetermined reference potential (bias potential) is applied to an end of the photodiode 111A (for example, upper electrode 126) via the wiring 130 (the first conductor 131 and the second conductor 132), the light entered from the upper electrode 126 side is converted into a signal charge of amount corresponding to the amount of received light. That is, the sensor substrate 10 performs photoelectric conversion. The signal charge generated by the photoelectric conversion is extracted as a photoelectric current from the other end (for example, the lower electrode 124) side of the photodiode 111A.

Specifically, the electric charge generated by the photoelectric conversion in the photodiode 111A is read out as the photoelectric current and output as an imaging signal from the TFT 111B. The imaging signal output as described above is output to the vertical signal line 18 according to a row scanning signal transmitted from the row scanning unit 13 via the pixel drive line 17. The imaging signal output to the vertical signal line 18 is output to the horizontal selection unit 14 for each pixel column through the vertical signal line 18. Through selective scanning by the column scanning unit 15, the imaging signal of each pixel transmitted through each of the vertical signal lines 18 is sequentially output to the horizontal signal line 19. The imaging signal is transmitted to the outside of the substrate 11 through the horizontal signal line 19. That is, output data Dout is output to the outside of the imaging device 1 or 1A. Thus, the imaging device 1 or 1A generates an imaged image using the radiation. The following describes a method for manufacturing the imaging device 1 and 1A.

1-5. Method for Manufacturing Imaging Device

Figure 9:
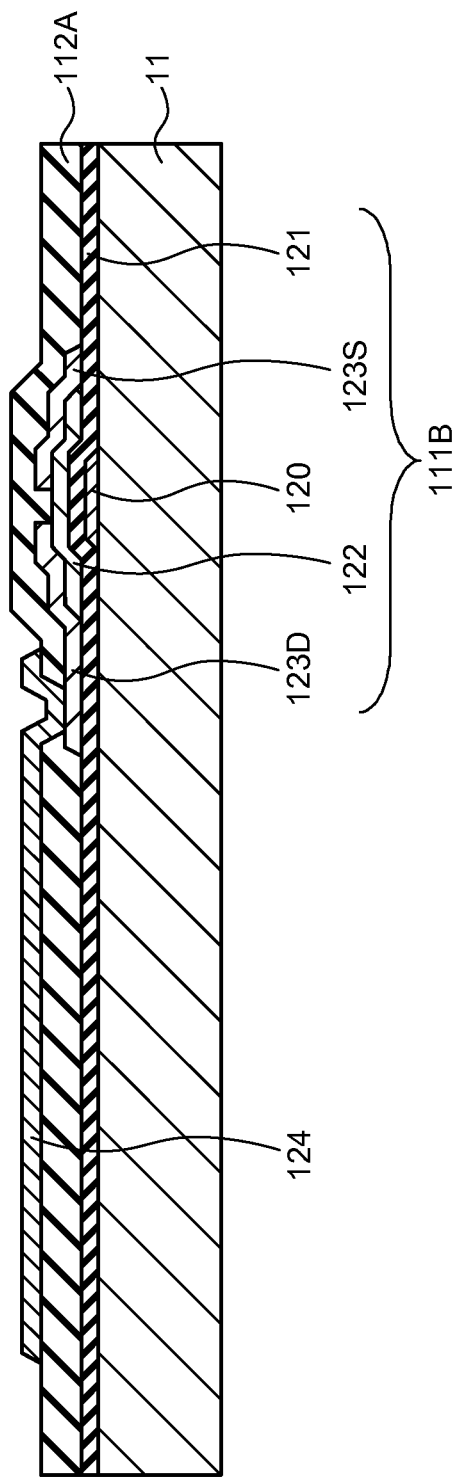
FIG. 9 is a cross-sectional view illustrating a method for manufacturing the imaging device in the order of process.

FIGS. 9 to 14 are cross-sectional views illustrating the method for manufacturing the imaging device in the order of process. In manufacturing the imaging device 1 or 1A, first, the sensor substrate 10 is made. Specifically, as illustrated in FIG. 9, for example, the TFT 111B is formed on the surface of the substrate 11 made of glass through a thin layer process. Subsequently, the first insulating interlayer 112A including the materials described above is formed over the surface of the TFT 111B using a chemical vapor deposition (CVD) method and a photolithography method, for example. Thereafter, the lower electrode 124 including the materials described above is formed to be electrically coupled to the drain electrode 123D of the TFT 111B, using a sputtering method and the photolithography method, for example.

Figure 10:
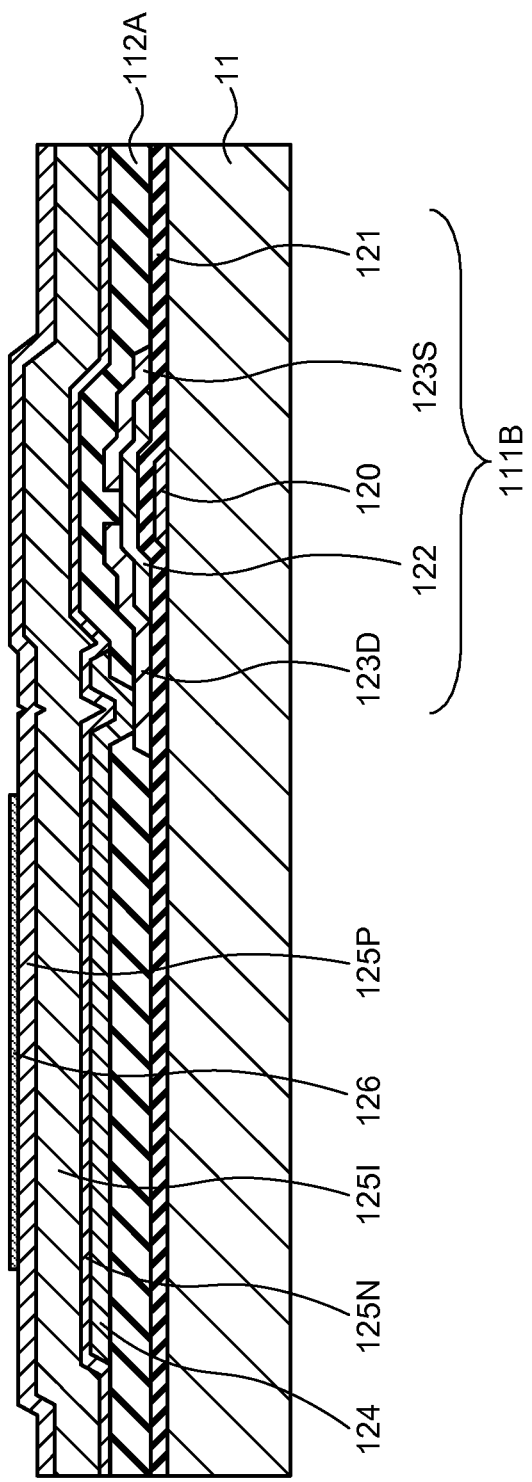
FIG. 10 is a cross-sectional view illustrating the method for manufacturing the imaging device in the order of process.

Next, as illustrated in FIG. 10, the n-type semiconductor layer 125N, the i-type semiconductor layer 125I, and the p-type semiconductor layer 125P including the materials described above are formed in this order over the entire surface of the first insulating interlayer 112A using the CVD method, for example. Thereafter, the upper electrode 126 including the materials described above is formed in a region on the surface of the p-type semiconductor layer 125P in which the photodiode 111A is to be formed, using the sputtering method and the photolithography method, for example.

Figure 11:
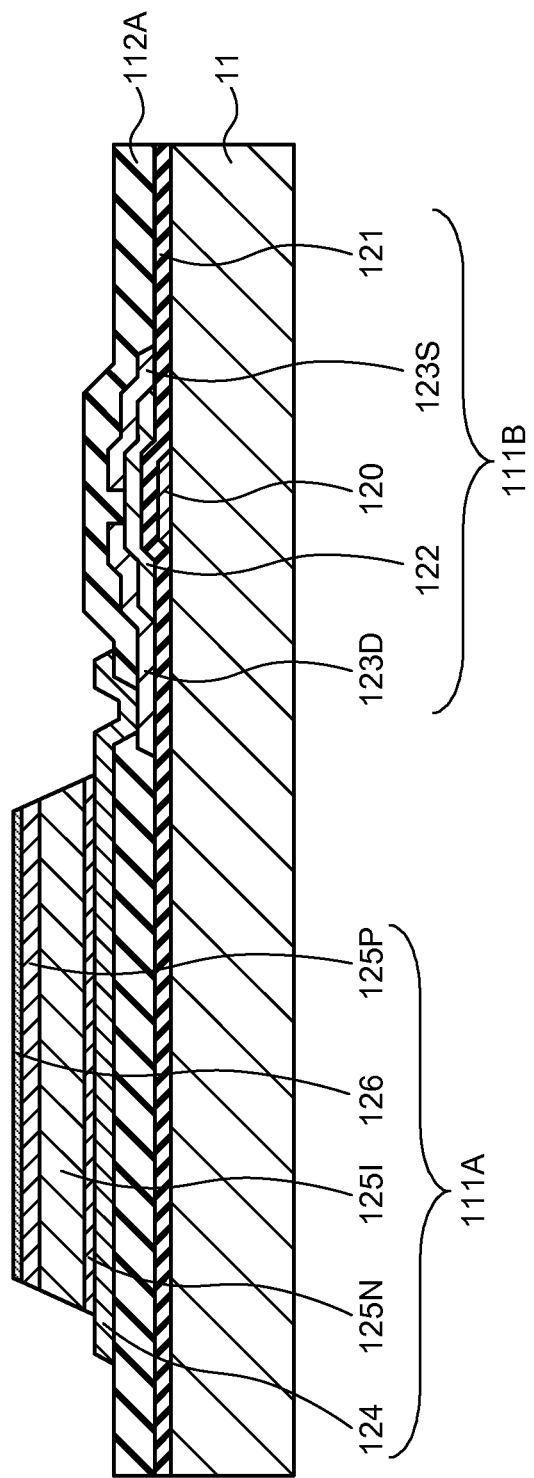
FIG. 11 is a cross-sectional view illustrating the method for manufacturing the imaging device in the order of process.

Subsequently, as illustrated in FIG. 11, a laminated structure of the n-type semiconductor layer 125N, the i-type semiconductor layer 125I, and the p-type semiconductor layer 125P formed as described above is patterned into a predetermined shape using a dry etching method, for example. Through this process, the photodiode 111A is formed on the substrate 11.

Figure 12:
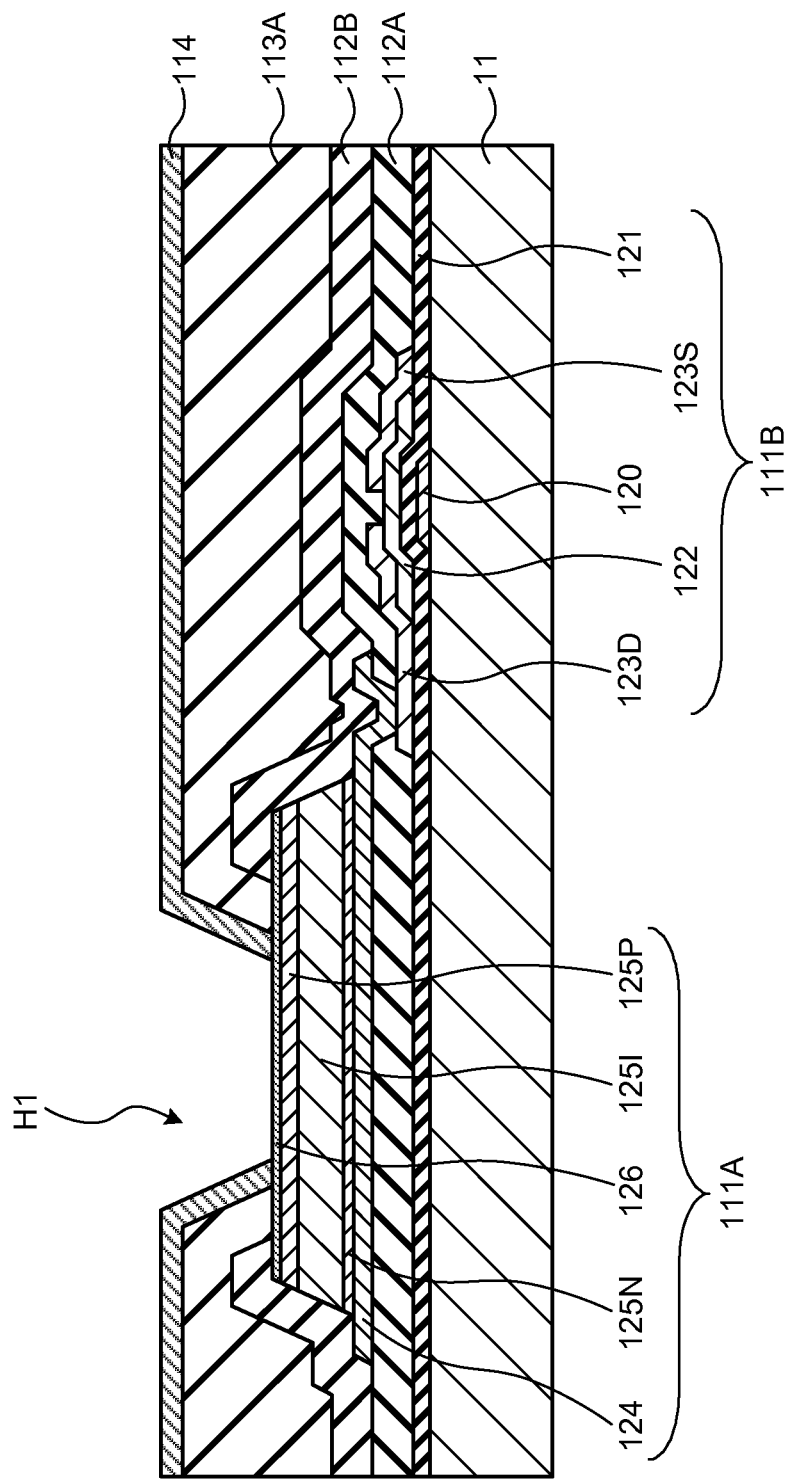
FIG. 12 is a cross-sectional view illustrating the method for manufacturing the imaging device in the order of process.

Next, as illustrated in FIG. 12, the second insulating interlayer 112B including the materials described above is formed to cover the surface of the TFT 111B and the side surface and an end of the surface (the surface of the upper electrode 126) of the photodiode 111A using the CVD method and the photolithography method, for example. Thereafter, the first planarization layer 113A including the materials described above (transparent resin in which light shielding particles are dispersed) is formed over the entire surface of the second insulating interlayer 112B (upper layer side of the photodiode 111A and the TFT 111B) using the CVD method, for example.

Next, the opening H1 is formed corresponding to the formation region of the photodiode 111A in the first planarization layer 113A and the protective layer 114 by performing etching (dry etching, for example) using the photolithography method, for example. Through such a process, the first planarization layer 113A including the black layer described above is formed. Subsequently, the protective layer 114 including the materials described above is formed on the surface of the first planarization layer 113A using the CVD method and the photolithography method, for example.

Figure 13:
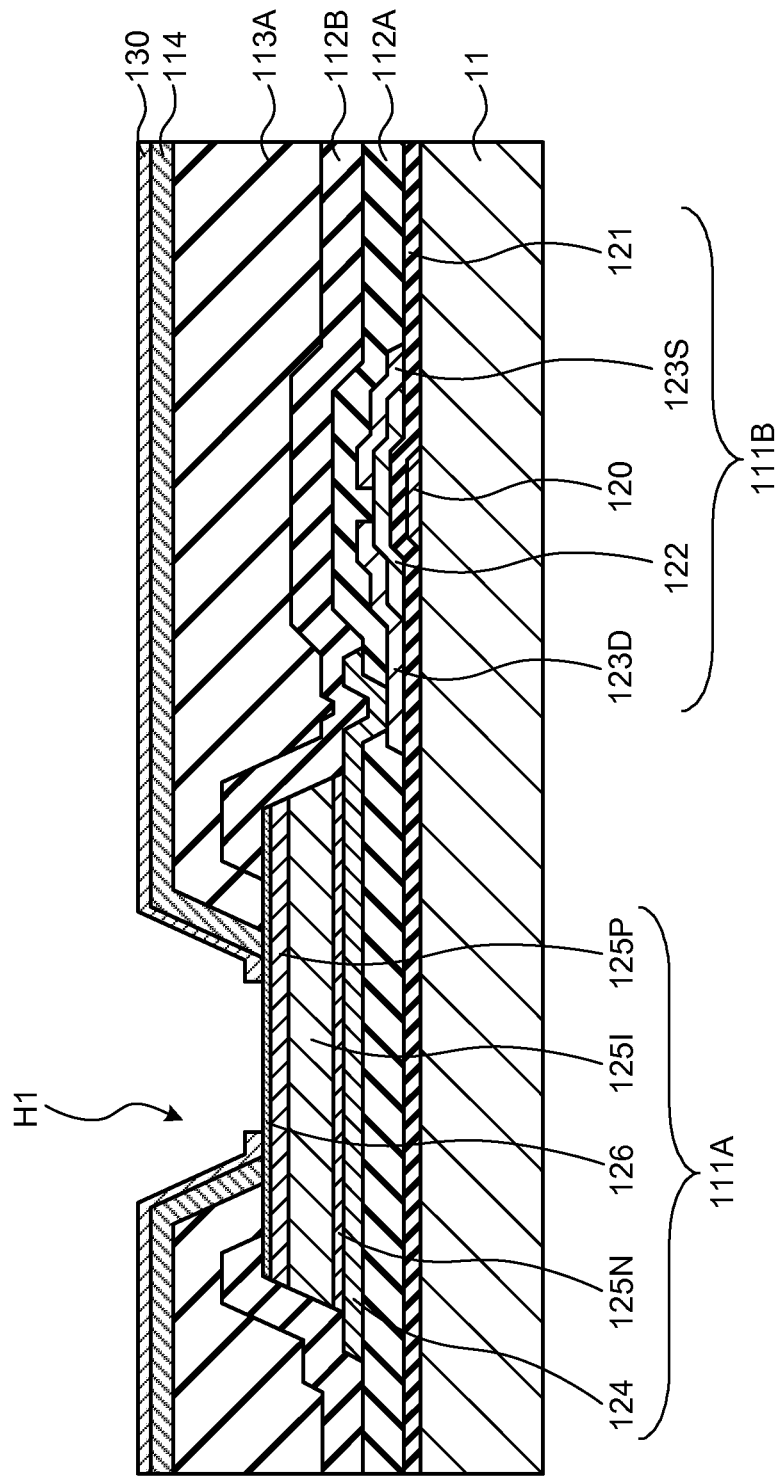
FIG. 13 is a cross-sectional view illustrating the method for manufacturing the imaging device in the order of process.

Next, as illustrated in FIG. 13, the wiring 130 including Al, Cu, or the like is formed on the surface of the protective layer 114 using the sputtering method and the photolithography method, for example. By performing etching (dry etching, for example) using the photolithography method, for example, the opening H1 is formed corresponding to the formation region of the photodiode 111A in the wiring 130.

Figure 14:
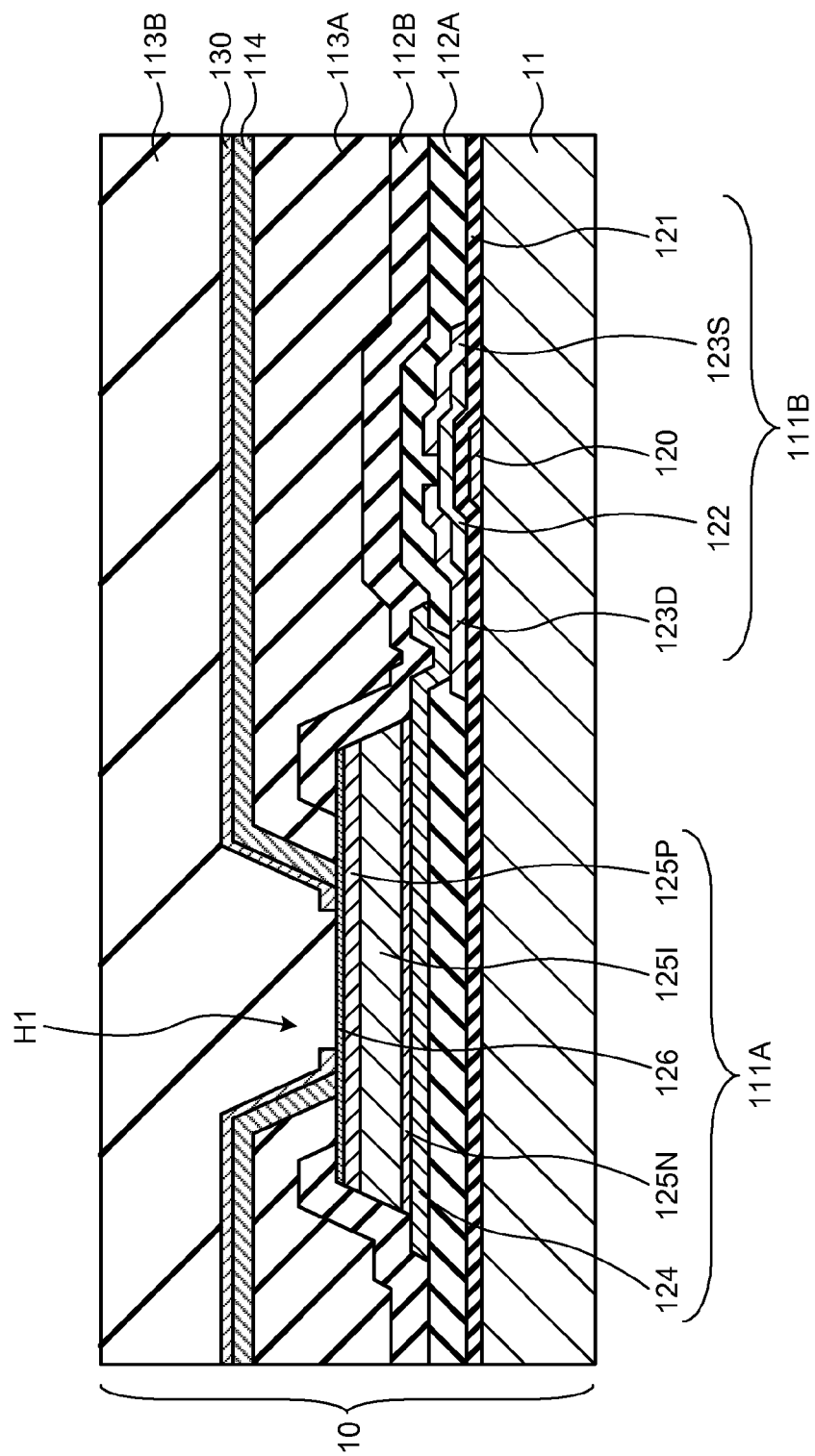
FIG. 14 is a cross-sectional view illustrating the method for manufacturing the imaging device in the order of process.

Subsequently, as illustrated in FIG. 14, the second planarization layer 113B including the materials described above is formed over the entire surface of the upper electrode 126 and the wiring 130 using the CVD method, for example. This completes the sensor substrate 10 illustrated in FIG. 3 and FIG. 4.

Finally, the wavelength conversion member 20, which is separately made according to the manufacturing method described above, is attached to the surface of the sensor substrate 10, more specifically, to the surface of the second planarization layer 113B. This is achieved by bonding the peripheral region of the pixel area 12 to the wavelength conversion member 20 through sealing material and the like, or pushing and fixing the periphery of the pixel area 12 or the entire surface of the panel through a fixing member, for example. This completes the imaging device 1 or 1A.

2. Modifications

2-1. First Modification

Figure 15:
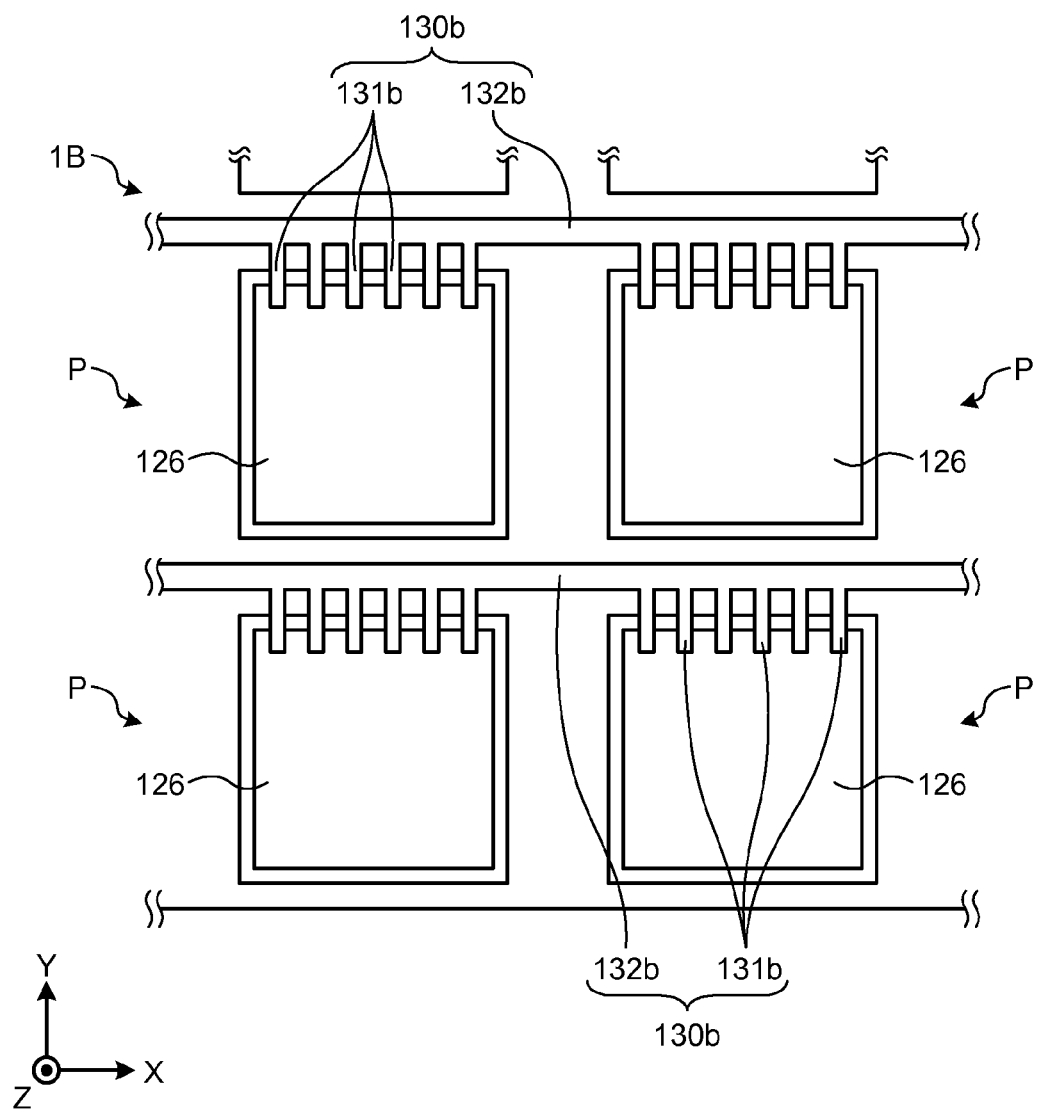
FIG. 15 is a diagram illustrating an imaging device according to a first modification.

FIG. 15 is a diagram illustrating an imaging device according to a first modification. FIG. 15 illustrates an enlarged view of the pixels P and wiring 130b included in this imaging device 1B. The diagrams of the following modifications are illustrated in the same manner. In the wiring 130b included in the imaging device 1B, a second conductor 132b is provided between adjacent pixels P, and at a position where the second conductor 132b is opposed to one of the pixels P, provided are a plurality of first conductors 131b that electrically couple the second conductor 132b and the upper electrode 126 corresponding to the one of the pixels P.

The second conductor 132b of the wiring 130b extends in the row direction, which is the X direction. The second conductor 132b is arranged between adjacent pixel rows. The first conductor 131b extends from the second conductor 132b in the column direction, which is the Y direction. The first conductor 131b is electrically coupled to the upper electrode 126 of one pixel P adjacent to and opposed to the second conductor 132b. In the present modification, the wiring 130b has a plurality of first conductors 131b (six in the modification) for each upper electrode 126 corresponding to one pixel P. This configuration provides more coupling points between the wiring 130b and the upper electrode 126 corresponding to one pixel P. As a result, even if one first conductor 131b is disconnected, the conduction in the wiring 130b is maintained by another first conductor 131b that is not disconnected, thereby improving the reliability of the imaging device 1B.

The wiring 130b electrically couples the first conductors 131b and the upper electrode 126 at a position where one side of the rectangular pixel P is opposed to the second conductor 132b. This configuration can easily have a larger number of first conductors 131b. In the present modification, the wiring 130b has the first conductors 131b at one side of the second conductor 132b in the direction orthogonal to the longitudinal direction of the second conductor 132b. However, the modification is not limited thereto. For example, the wiring 130b may have the first conductors 131b at both sides of the second conductor 132b in the direction orthogonal to the longitudinal direction of the second conductor 132b. The wiring 130b may electrically couple the first conductors 131b extending along both sides of the second conductor 132b and the upper electrodes 126 corresponding to the pixels P adjacently placed on both sides of the second conductor 132b. This arrangement secures a large number of coupling points between the wiring 130b and the upper electrode 126 of the pixel P, further improving the reliability of the imaging device 1B.

2-2. Second Modification

Figure 16:
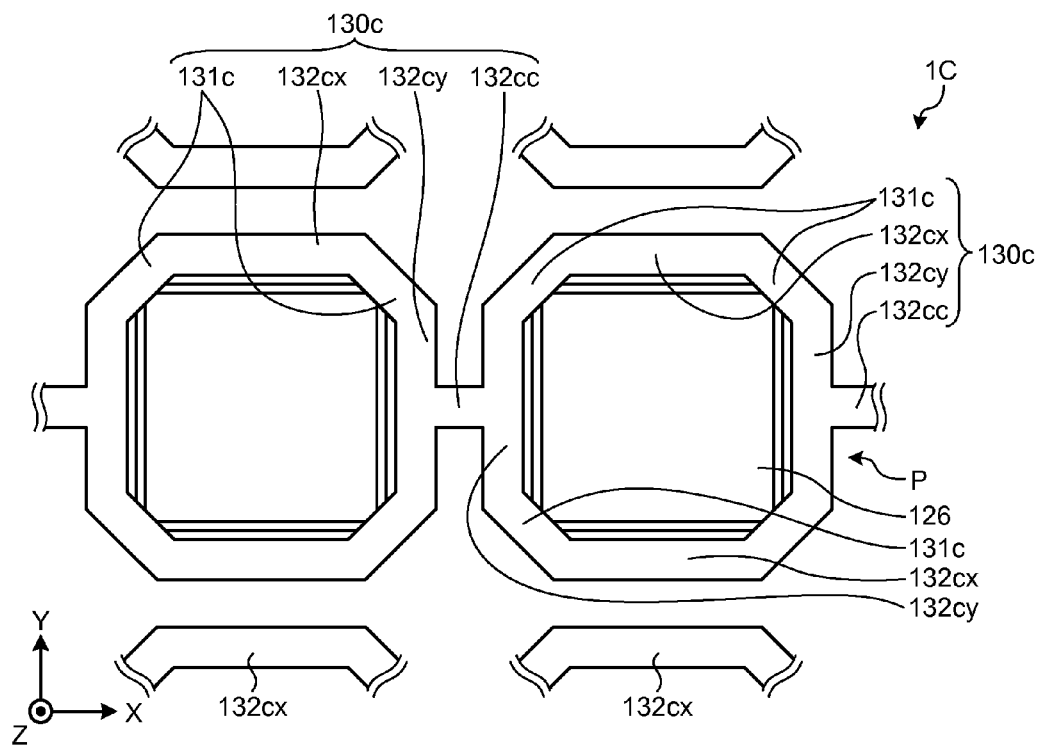
FIG. 16 is a diagram illustrating an imaging device according to a second modification.
Figure 17:
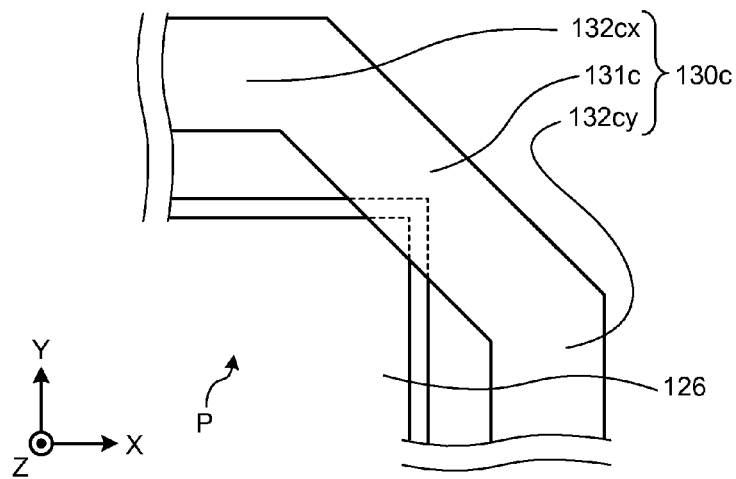
FIG. 17 is an enlarged view of a connecting portion between the first conductor and a transparent electrode of a pixel.

FIG. 16 is a diagram illustrating an imaging device according to a second modification. FIG. 17 is an enlarged view of a coupling portion between the first conductor and the transparent electrode of a pixel. In wiring 130c included in this imaging device 1C, a first conductor 131c is electrically coupled to the upper electrode 126 at at least three corners (three corners of the rectangular region) of the four corners of the pixel P having a rectangular shape in a plan view. In the present modification, the first conductor 131*c* is electrically coupled to the upper electrode 126 at the four corners of the pixel P.

The wiring 130*c* in the imaging device 1C includes the first conductor 131*c* and second conductors 132*cx*, 132*cy*, and 132*cc*. The wiring 130*c* includes four first conductors 131*c*, two second conductors 132*cx*, and two second conductors 132*cy* for each pixel P. The first conductors 131*c* are inclined at a predetermined angle (45 degrees in the present modification) with respect to the X direction and the Y direction. The two second conductors 132*cy* extend in the column direction, which is the Y direction, and are arranged in parallel. The two second conductors 132*cx* extend in the row direction, which is the X direction, and are arranged in parallel. The adjacent first conductors 131*c* are electrically coupled to each other via the second conductors 132*cx* and 132*cy*. In such a structure, the first conductor 131*c* and the second conductors 132*cx* and 132*cy* are arranged to surround one pixel P.

In the pixels P adjacent to each other in the X direction, the second conductors 132*cy* extending in the column direction and adjacent to each other in the X direction are electrically coupled by the second conductor 132*cc* extending in the X direction. In such a structure, the second conductors 132*cx*, 132*cy*, and 132*cc* of the wiring 130*c* electrically couples, in the row direction, the first conductors 131*c* electrically coupled to the upper electrode 126 of each pixel P.

In the wiring 130*c*, the first conductors 131*c* are electrically coupled to the upper electrode 126 corresponding to one pixel P. This configuration provides more coupling points between the wiring 130*c* and the upper electrode 126 corresponding to one pixel P. As a result, even if one first conductor 131*c* is disconnected, the conduction in the wiring 130*c* is maintained by another first conductor 131*c* that is not disconnected, thus improving the reliability of the imaging device 1C.

As illustrated in FIG. 17, the first conductor 131*c* covers all of the corner parts of the upper electrode 126. Accordingly, even if the first conductor 131*c* is disconnected on the row direction side or the column direction side of the upper electrode 126, the conduction between the first conductor 131*c* and the upper electrode 126 may be secured on the other side that is not disconnected. As a result, power supply to the upper electrode 126 may be secured across the entire region of the wiring 130*c*, further improving the reliability of the imaging device 1C.

The present modification does not necessarily require the second conductor 132*cc* provided between the pixels P adjacent to each other in the row direction and extending in the row direction. In such a case, one second conductor 132*cy* functions as two second conductors 132*cy* extending in the column direction and adjacent to each other in the row direction. Then the total of four first conductors 131*c* electrically coupled to the upper electrodes 126 of both the adjacent pixels P are electrically coupled to the one shared second conductor 132*cy*. This eliminates need of the second conductor 132*cc* extending in the row direction, thereby simplifying the structure of the wiring 130*c* and narrowing gaps between the pixels P.

In the present modification, the second conductors 132*cx* between the pixels P adjacent to each other in the column direction may be electrically coupled. In this case, the second conductors 132*cx* between the pixels P adjacent to each other in the column direction may be electrically coupled by a second conductor extending in the column direction. One second conductor 132*cx* may function as two second conductors 132*cx* extending in the row direction and adjacent to each other in the column direction. Then the total of four first conductors 131*c*, two for each pixel P side, electrically coupled to the upper electrodes 126 of both the adjacent pixels P are electrically coupled to the one shared second conductor 132*cx*. Thus, by electrically connecting pieces of the wiring 130*c* in the column direction, even when one wiring 130*c* connecting the pixels P arranged in the row direction is disconnected, conduction may be secured by the wiring 130*c* that is not disconnected in another pixel row, further improving the reliability of the imaging device 1C.

2-3. Third Modification

Figure 18:
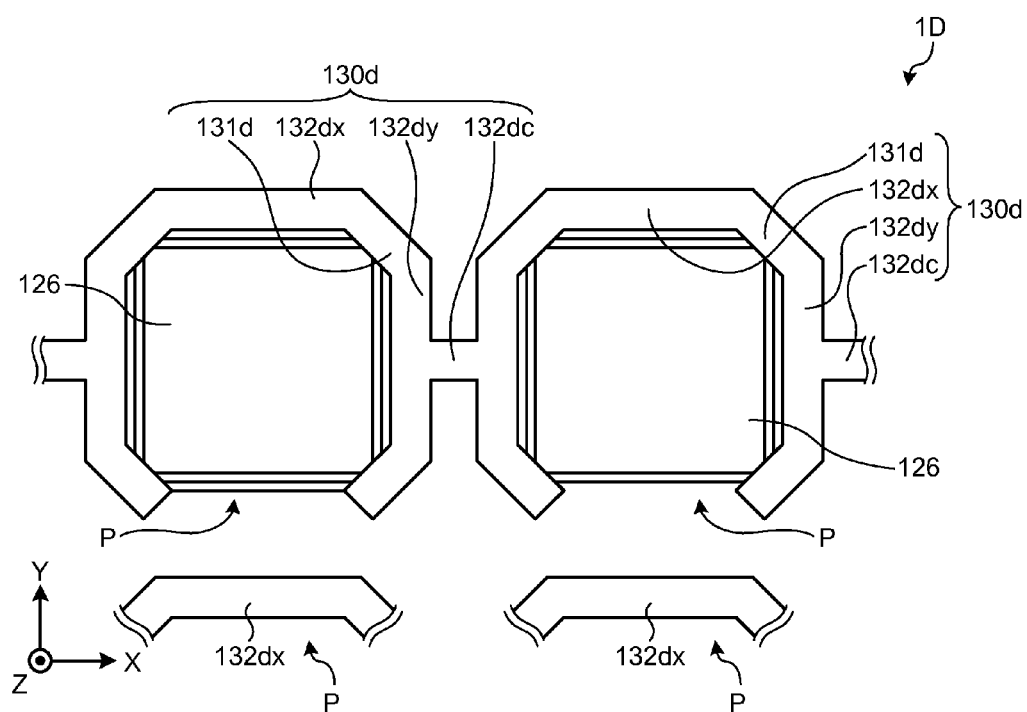
FIG. 18 is a diagram illustrating an imaging device according to a third modification.

FIG. 18 is a diagram illustrating an imaging device according to a third modification. The third modification is similar to the second modification except that the former lacks one of the two second conductors 132*cx* that are included in the wiring 130*c* in the second modification, extend in the row direction, which is the X direction, and are arranged in the column direction, which is the Y direction.

Wiring 130*d* of this imaging device 1D includes four first conductors 131*d*, second conductors 132*dx* and 132*dy* that electrically couple adjacent first conductors 131*d*, and a second conductor 132*dc* that electrically couples the second conductors 132*dy* extending in the column direction between adjacent pixels P.

In the wiring 130*d*, the first conductors 131*d* are electrically coupled to the upper electrode 126 corresponding to one pixel P. This configuration provides more coupling points between the wiring 130*d* and the upper electrode 126 corresponding to one pixel P. As a result, even if one first conductor 131*d* is disconnected, the conduction in the wiring 130*d* is maintained by another first conductor 131*d* that is not disconnected, thus improving the reliability of the imaging device 1D.

2-4. Fourth Modification

FIG. 19 is a diagram illustrating an imaging device according to a fourth modification. FIG. 20 is an enlarged view of a connecting portion between the first conductor and the transparent electrode of a pixel. Wiring 130*e* of this imaging device 1E includes a first conductor 131*e*, and second conductors 132*ex*, 132*ey*, and 132*ec*. Two first conductors 131*e* are electrically coupled to the respective corners of the upper electrode 126 corresponding to two corners (two corners of the rectangular region) of the pixel P having a rectangular shape in a plan view. The two first conductors 131*e* are inclined at a predetermined angle (45 degrees in the present modification) with respect to the X direction and the Y direction.

An end of the first conductor 131*e* is electrically coupled to the second conductor 132*ex* extending in the row direction, which is the X direction. The other end of the first conductor 131*e* is electrically coupled to the second conductor 132*ey* extending in the column direction, which is the Y direction. An end of the second conductor 132*ey* extending in the column direction that is not coupled to the first conductor 131*e* is electrically coupled to the second conductor 132*ex* extending in the row direction. In such a structure, the first conductor 131*e* and the second conductors 132*ex* and 132*ey* form a triangle at a corner part of the pixel P. One side of the triangle, which is the first conductor 131*e*, is electrically coupled to the upper electrode 126 of the pixel P. The first conductors 131*e* of the wiring 130*e* are electrically coupled to the upper electrode 126 at two points for each pixel P. Between adjacent pixels P, the second conductors 132*ey* opposed to each other and extending in the column direction are electrically coupled by the second conductor 132*ec* extending in the row direction.

In the wiring 130e, a plurality of first conductors 131e (two in the present modification) are electrically coupled to the upper electrode 126 corresponding to one pixel P. This configuration provides more coupling points between the wiring 130e and the upper electrode 126 corresponding to one pixel P. As a result, even if one first conductor 131e is disconnected, the conduction in the wiring 130e is maintained by another first conductor 131e that is not disconnected, thus improving the reliability of the imaging device 1E.

As illustrated in FIG. 20, it is preferable that the first conductor 131e traverses the corner part of the pixel P and the corner part of the upper electrode 126 is fitted in the first conductor 131e. Accordingly, even if the first conductor 131e is disconnected on the row direction side or the column direction side of the upper electrode 126, the conduction between the first conductor 131e and the upper electrode 126 can be secured on the other side that is not disconnected. As a result, power supply to the upper electrode 126 can be secured across the entire region of the wiring 130e, further improving the reliability of the imaging device 1E.

2-5. Fifth Modification

Figure 21:
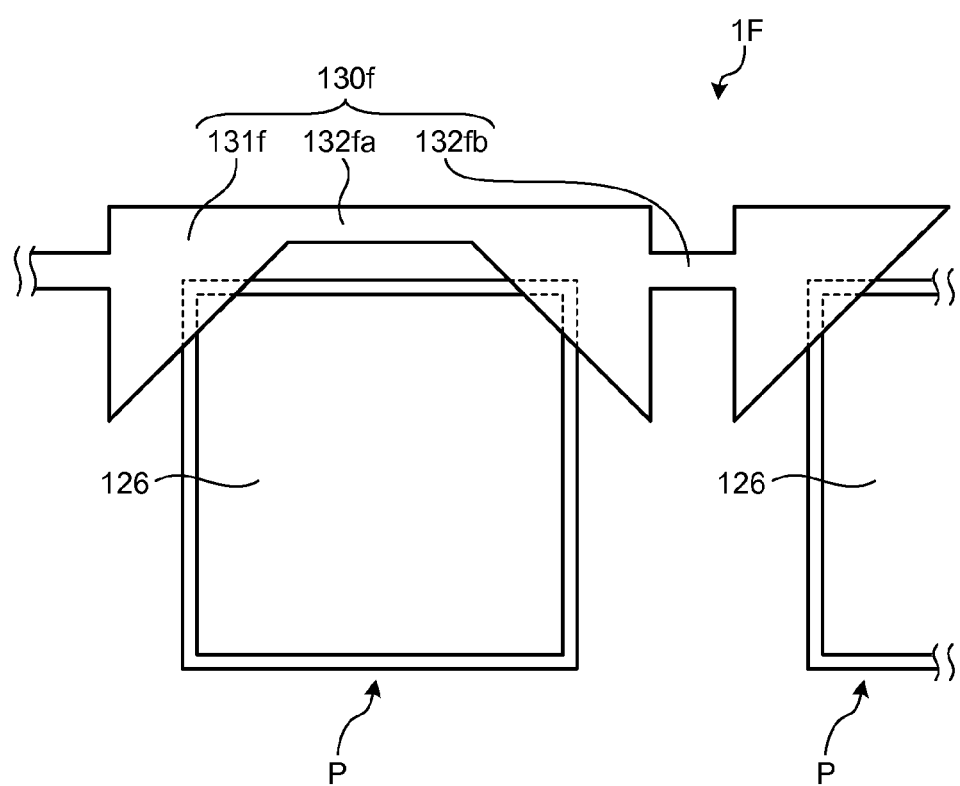
FIG. 21 is a diagram illustrating an imaging device according to a fifth modification.

FIG. 21 is a diagram illustrating an imaging device according to a fifth modification. Wiring 130f of this imaging device 1F includes a first conductor 131f having a substantially triangular shape in a plan view, a second conductor 132fa that electrically couples the first conductors 131f adjacent to each other in one pixel P, and a second conductor 132fb that electrically couples the first conductors 131f adjacent to each other and opposed to each other between adjacent pixels P. The first conductors 131f are electrically coupled to the upper electrode 126 at positions corresponding to two corners of the pixel P having a rectangular shape in a plan view. Two first conductors 131f are provided for each pixel P. Both the second conductors 132fa and 132fb extend in the row direction, which is the X direction.

The first conductor 131f has a substantially triangular shape in a plan view, so that the first conductor 131f covers the entire part of the upper electrode 126 corresponding to the corners of the pixel P. Accordingly, even if the first conductor 131f is disconnected on the row direction side or the column direction side of the upper electrode 126, the conduction between the first conductor 131f and the upper electrode 126 can be secured on the other side that is not disconnected. As a result, power supply to the upper electrode 126 can be secured across the entire region of the wiring 130f, further improving the reliability of the imaging device 1F.

3. Application Example

The following describes an example in which the imaging device 1 (1A to 1F) according to the embodiment or the modifications described above is employed in an imaging display system.

Figure 22:
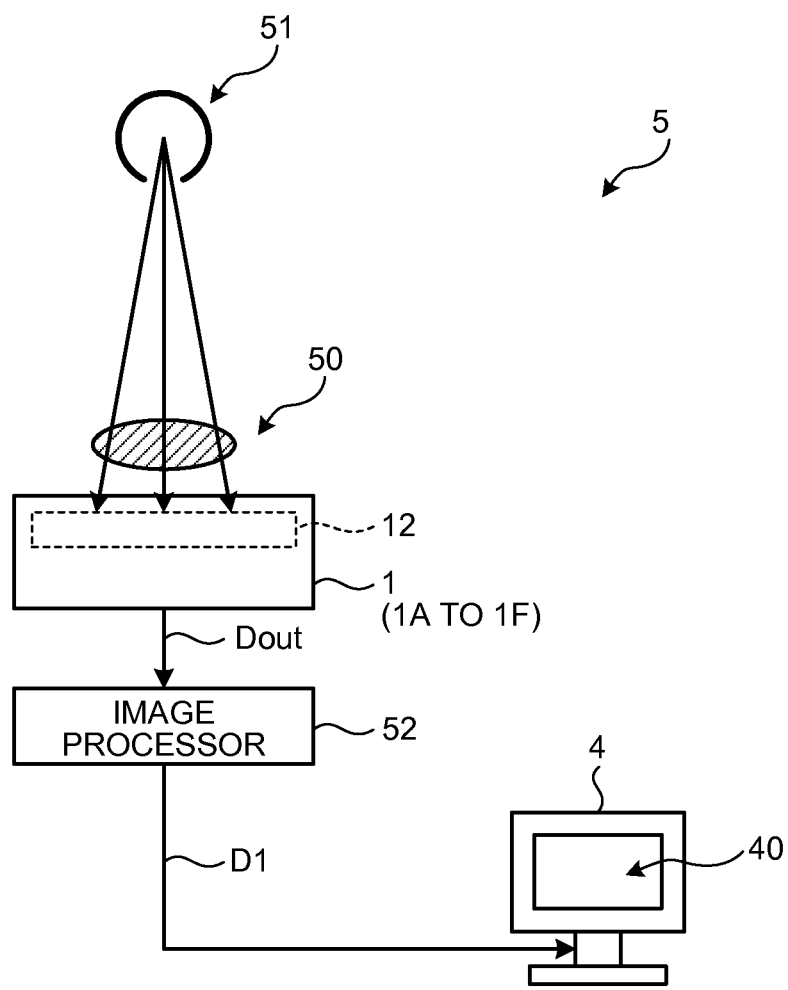
FIG. 22 is a diagram illustrating an example of the schematic configuration of an imaging display system according to an application example.

FIG. 22 is a diagram illustrating an example of the schematic configuration of the imaging display system according to an application example. This imaging display system 5 is a system using radiation (radiation imaging display system) and including the imaging device 1 (1A to 1F) according to the embodiment or the modifications described above, an image processor 52, and a display device 4. The imaging device 1 (1A to 1F) includes the pixel area 12.

The image processor 52 applies predetermined image processing to the output data Dout (imaging signal) output from the imaging device 1 (1A to 1F) to generate image data D1. The display device 4 displays an image based on the image data D1 generated by the image processor 52 on a predetermined monitor screen 40.

The imaging device 1 (1A to 1F) generates the output data Dout as image data of a subject 50 based on irradiation light (herein, radiation) applied from a light source (herein, a radiation source 51 such as an X-ray source) to the subject 50, and outputs the output data Dout to the image processor 52. The image processor 52 applies the predetermined image processing to the received output data Dout, and outputs the image data (display data) D1 after the image processing to the display device 4. The display device 4 displays image information (imaged image) based on the input image data D1 on the monitor screen 40.

As described above, in the imaging display system 5, the imaging device 1 (1A to 1F) can acquire the image of the subject 50 as an electric signal, so that the image can be displayed on a display device such as a monitor by transmitting the acquired electric signal to the display device 4. That is, the imaging display system 5 allows the image of the subject 50 to be observed without using a radiographic layer. The imaging display system 5 can be also adapted to moving image photographing and moving image display.

Figure 23:
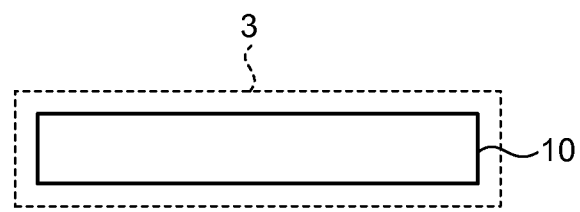
FIG. 23 is a diagram illustrating an example of the schematic configuration of an imaging display system according to another application example.

FIG. 23 is a diagram illustrating an example of the schematic configuration of an imaging display system according to another application example. Hereinabove, described is the example in which the imaging device 1 (1A to 1F) is a radiation imaging device. The present disclosure is not limited thereto, and may be applied to an imaging device other than the radiation imaging device and an imaging display system other than the radiation imaging display system. Specifically, for example, an imaging device 3 illustrated in FIG. 23 has a configuration in which the wavelength conversion member 20 is eliminated from the imaging device 1 described in the above embodiment and only the sensor substrate 10 is provided. The imaging device 3 may be a device such as the imaging devices 1A to 1F in the modifications described above without the wavelength conversion member 20. The imaging device 3 has functions and effects similar to those of the imaging device 1 or the like because the sensor substrate 10 includes the wiring 130 and the like described in the above embodiment and a wiring structure using the wiring 130 and the like.

Hereinabove, the present disclosure has been described. However, the present disclosure is not limited by the above description. The components of the present disclosure described above include those that are easily conceivable by those skilled in the art, those that are substantially identical thereto, and a so-called equivalent. The components described above may be combined as appropriate. The components may be variously omitted, substituted, and modified in a range not deviating from the gist of the present disclosure.

For example, in the embodiment described above, described is the example in which the semiconductor layer of the photodiode 111A and the TFT 111B is mainly made of an amorphous semiconductor (amorphous silicon, for example). However, the embodiment is not limited thereto. That is, for example, the semiconductor layer described above may be formed of a polycrystalline semiconductor (polycrystalline silicon, for example) or a microcrystalline semiconductor (microcrystalline silicon, for example).

4. Aspects of the Present Disclosure

The present disclosure includes aspects as described below.

(1) An imaging device comprising:
a plurality of pixels each including a photoelectric conversion element and arranged on a same plane;
a transparent electrode provided on a surface of the photoelectric conversion element;
a plurality of first conductors, each of which is electrically coupled to the transparent electrode corresponding to one photoelectric conversion element at a plurality of points and provided to the transparent electrode corresponding to one photoelectric conversion element; and
a second conductor that is provided between adjacent pixels and electrically couples the first conductors, and also electrically couples the first conductors between the adjacent pixels.

(2) The imaging device according to (1), wherein
each of the pixels comprises a driving element for extracting an electric charge accumulated by the photoelectric conversion element, and
the second conductor is provided at a position overlapping with a drive line for giving the driving element a signal for driving the driving element when viewed from a direction orthogonal to a surface of the pixels.

(3) The imaging device according to (1), wherein
the pixels are arranged in a matrix, and
at least one of the first conductors electrically coupled to the transparent electrode corresponding to the one photoelectric conversion element is electrically coupled through a gap in a row direction and a gap in a column direction that are formed between the adjacent pixels.

(4) The imaging device according to (1), wherein
each of the pixels has a substantially rectangular shape in a plan view, and
each of the first conductors electrically couples the transparent electrodes provided at four corners of the pixels and present at opposed corner positions of the adjacent pixels.

(5) The imaging device according to (1), wherein
each of the pixels has a substantially rectangular shape in a plan view, and
the second conductor is provided between the adjacent pixels, and the first conductors that electrically couple the second conductor and the transparent electrode corresponding to one of the pixels are provided at a position where the second conductor is opposed to the pixel.

(6) The imaging device according to (1), wherein
one of the pixels has a substantially rectangular shape in a plan view, and
the first conductors are electrically coupled to the transparent electrodes present at at least three of four corners of the pixel.

(7) An imaging display system comprising:
the imaging device according to (1);
a wavelength conversion member provided on a light incident surface side of the imaging device; and
a display device that displays an image based on an imaging signal output from the imaging device.

In the present disclosure, a first conductor and a second conductor are used as the wiring for applying the predetermined reference potential to the electrode (transparent electrode) of the photoelectric conversion element. A plurality of first conductors are electrically coupled to a plurality of points on the transparent electrode corresponding to one pixel, and are electrically coupled to the second conductor arranged between adjacent pixels. As described above, the first conductors as the wiring for applying the predetermined reference potential to the photoelectric conversion element are electrically coupled to the portions of the transparent electrode corresponding to one pixel. Thus, even if one of the first conductors is disconnected at one coupling point, the other first conductors that are not disconnected secure the function of the wiring for applying the predetermined reference potential to the photoelectric conversion element. This configuration has an improved redundancy of the wiring for applying the predetermined reference potential to the photoelectric conversion element, which prevents deterioration of the reliability of the imaging device and the imaging display system. The second conductor as the wiring for applying the predetermined reference potential to the photoelectric conversion element is arranged between the adjacent pixels, avoiding the light receiving surface of the photoelectric conversion element. This arrangement prevents deterioration of the light detection sensitivity of the photoelectric conversion element, and deterioration of performance of the imaging device.

The present disclosure provides an imaging device and an imaging display system that can prevent deterioration of light detection sensitivity and deterioration of reliability of the imaging device.

According to the present disclosure, provided is the imaging device and the imaging display system that can prevent deterioration of the light detection sensitivity and deterioration of the reliability of the imaging device.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. An imaging device comprising:
a plurality of pixels each including a photoelectric conversion element and arranged on a same plane;
a transparent electrode provided on a surface of the photoelectric conversion element;
a plurality of first conductors, each of which is electrically coupled to the transparent electrode corresponding to one photoelectric conversion element at a plurality of points and provided to the transparent electrode corresponding to one photoelectric conversion element; and
a second conductor that is provided between adjacent pixels and electrically couples the first conductors, and also electrically couples the first conductors between the adjacent pixels.

2. The imaging device according to claim 1, wherein
each of the pixels comprises a driving element for extracting an electric charge accumulated by the photoelectric conversion element, and
the second conductor is provided at a position overlapping with a drive line for giving the driving element a signal for driving the driving element when viewed from a direction orthogonal to a surface of the pixels.

3. The imaging device according to claim 1, wherein
the pixels are arranged in a matrix, and
at least one of the first conductors electrically coupled to the transparent electrode corresponding to the one photoelectric conversion element is electrically coupled through a gap in a row direction and a gap in a column direction that are formed between the adjacent pixels.

4. The imaging device according to claim 1, wherein
each of the pixels has a substantially rectangular shape in a plan view, and
each of the first conductors electrically couples the transparent electrodes provided at four corners of the pixels and present at opposed corner positions of the adjacent pixels.

5. The imaging device according to claim 1, wherein
each of the pixels has a substantially rectangular shape in a plan view, and
the second conductor is provided between the adjacent pixels, and the first conductors that electrically couple the second conductor and the transparent electrode corresponding to one of the pixels are provided at a position where the second conductor is opposed to the pixel.

6. The imaging device according to claim 1, wherein
one of the pixels has a substantially rectangular shape in a plan view, and
the first conductors are electrically coupled to the transparent electrodes present at at least three of four corners of the pixel.

7. An imaging display system comprising:
the imaging device according to claim 1;
a wavelength conversion member provided on a light incident surface side of the imaging device; and
a display device that displays an image based on an imaging signal output from the imaging device.

* * * * *